(12) United States Patent
Okuda

(10) Patent No.: US 8,478,194 B2
(45) Date of Patent: Jul. 2, 2013

(54) RADIO BASE STATION, RELAY STATION AND RADIO COMMUNICATION METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 965 days.

(21) Appl. No.: 11/892,425

(22) Filed: Aug. 22, 2007

(65) Prior Publication Data

US 2008/0108303 A1      May 8, 2008

(30) Foreign Application Priority Data

Nov. 7, 2006   (JP) ................................ 2006-301214

(51) Int. Cl.
*H04B 7/185* (2006.01)

(52) U.S. Cl.
USPC ....... 455/13.1; 455/432.1; 455/436; 455/442; 455/561; 370/315; 370/331; 370/342; 370/332; 370/349

(58) Field of Classification Search
USPC ............ 455/7, 436, 9, 13.1, 432.1, 442, 437; 370/315, 338, 329, 331, 328, 341, 342, 349, 370/392, 492, 561
See application file for complete search history.

(56) References Cited

U.S. PATENT DOCUMENTS

| | | | |
|---|---|---|---|
| 6,985,716 B2* | 1/2006 | Talaie et al. | 455/403 |
| 7,031,722 B2* | 4/2006 | Naghian | 455/456.1 |
| 7,283,786 B2* | 10/2007 | Shimada et al. | 455/9 |
| 7,313,110 B2* | 12/2007 | Guey et al. | 370/329 |
| 7,352,729 B2* | 4/2008 | Fujiwara et al. | 370/338 |
| 7,386,036 B2* | 6/2008 | Pasanen et al. | 375/211 |
| 7,400,856 B2* | 7/2008 | Sartori et al. | 455/7 |
| 7,486,928 B2 | 2/2009 | Izumikawa et al. | |
| 7,519,029 B2* | 4/2009 | Takeda et al. | 370/335 |
| 7,522,729 B2* | 4/2009 | Ishidoshiro | 380/270 |
| 7,599,341 B2* | 10/2009 | Ramachandran | 370/338 |
| 7,619,998 B2* | 11/2009 | Takeda et al. | 370/312 |
| 7,796,546 B2* | 9/2010 | Lee et al. | 370/315 |
| 7,813,695 B2* | 10/2010 | Haartsen | 455/11.1 |
| 7,877,057 B2* | 1/2011 | Izumikawa et al. | 455/7 |

(Continued)

FOREIGN PATENT DOCUMENTS

| | | |
|---|---|---|
| EP | 1 689 201 | 8/2006 |
| EP | 2 058 958 | 5/2009 |

(Continued)

OTHER PUBLICATIONS

IEEE Computer Society and the IEEE Microwave Theory and Techniques Society, New York, NY 10016-5997, USA; IEEE Standard for Local and metropolitan area networks; Part 16: Air Interface for Fixed and Mobile Broadband Wireless Access Systems, Amendment 2: Physical and Medium Access Control Layers for Combined Fixed and Mobile Operation in Licensed Bands and Corrigendum 1; IEEE Std. 802.16e-2005 and IEEE Std 802.16-2004/Cor1-2005 (Amendment and Corrigendum to IEEE Std. 802.16/2004); Dated Feb. 28, 2006.

(Continued)

*Primary Examiner* — Marceau Milord

(74) *Attorney, Agent, or Firm* — Myers Wolin, LLC

(57) ABSTRACT

A relay station has a reception unit receiving a signal sequence indicating a connection request, from among a predetermined signal sequence group; a control unit generating a ranging request message indicating that a radio terminal newly requesting connection exists; and a transmission unit transmitting the ranging request message to a radio base station.

12 Claims, 15 Drawing Sheets

U.S. PATENT DOCUMENTS

| | | | | |
|---|---|---|---|---|
| 7,933,549 | B2* | 4/2011 | Larsson | 455/7 |
| 7,990,906 | B2* | 8/2011 | Viorel et al. | 370/315 |
| 7,995,524 | B2* | 8/2011 | Lin | 370/329 |
| 8,000,657 | B2* | 8/2011 | Do et al. | 455/67.13 |
| 8,010,044 | B2* | 8/2011 | Okuda | 455/15 |
| 8,014,284 | B2* | 9/2011 | Barkan | 370/235 |
| 8,018,893 | B2* | 9/2011 | Sartori et al. | 370/329 |
| 8,223,659 | B2* | 7/2012 | Do et al. | 370/248 |
| 2002/0058519 | A1* | 5/2002 | Nagahara | 455/456 |
| 2003/0125067 | A1* | 7/2003 | Takeda et al. | 455/522 |
| 2004/0266339 | A1* | 12/2004 | Larsson | 455/7 |
| 2005/0030931 | A1 | 2/2005 | Sung et al. | |
| 2005/0041573 | A1 | 2/2005 | Eom et al. | |
| 2006/0046643 | A1* | 3/2006 | Izumikawa et al. | 455/7 |
| 2006/0153132 | A1* | 7/2006 | Saito | 370/329 |
| 2006/0281404 | A1* | 12/2006 | Lee et al. | 455/11.1 |
| 2007/0076684 | A1 | 4/2007 | Lee et al. | |
| 2007/0081507 | A1* | 4/2007 | Koo et al. | 370/338 |
| 2007/0087691 | A1* | 4/2007 | Lee et al. | 455/13.2 |
| 2007/0133500 | A1* | 6/2007 | Rajkotia et al. | 370/348 |
| 2007/0218908 | A1* | 9/2007 | Kang et al. | 455/442 |
| 2008/0108355 | A1* | 5/2008 | Oleszcsuk | 455/442 |
| 2008/0285500 | A1* | 11/2008 | Zhang et al. | 370/315 |

FOREIGN PATENT DOCUMENTS

| | | |
|---|---|---|
| JP | 2006-295778 | 10/2006 |
| JP | 2006-303802 | 11/2006 |
| WO | 2006/024320 | 3/2006 |
| WO | 2007/100224 | 9/2007 |

OTHER PUBLICATIONS

Vipul Gupta et al., Sun Microsystems; "Secruing the Wireless Internet"; IEEE Communications Magazine, Dec. 2001.

Korean Intellectual Property Office, Notice of Preliminary Rejection, for corresponding Korean Patent Application No. 10-2009-102434, mailed Jan. 4, 2010. English translation attached.

Korean Intellectual Property Office, Notice of Preliminary Rejection, for corresponding Korean Patent Application No. 10-2009-102440, mailed Jan. 18, 2010. English translation attached.

Korean Intellectual Property Office, Notice of Preliminary Rejection for Korean Patent Application No. 10-2007-0093317, with a mailing date May 27, 2009; English Translation attached.

Partial European Search Report with written opinion issued for corresponding European Patent Application No. 07114614.6, dated Dec. 27, 2010.

Yu-Ching Hsu et al; "Mobility Management for Mobile Multihop Relay Networks"; Internet citation; Sep. 13, 2005; [Ref.: ESR dated Dec. 27, 2010] [URL:http://grouper.ieee.org/groups/802/16/sg/nmr/contrib/].

Taiwan Intellectual Property Office, Office Action and Search Report, for corresponding Taiwanese Patent Application No. 96131474, dated May 2, 2011. Partial English translation attached.

802.16 IEEE Standard for Local and Metropolitan Area Networks "*Part 16: Air Interface for Fixed Broadband Wireless Access Systems*", IEEE Computer Society and the IEEE Microwave Theory and Techniques Society, dated Oct. 1, 2004; pp. 1-857.

IEEE802.16e IEEE Standard for Local and Metropolitan area Networks "*Part 16: Air Interface for Fixed and Mobile Broadband Wireless Access Systems*"; Amendment 2: Physical and Medium Access Control Layers for Combined Fixed and Mobile Operation in Licensed Bands and Corrigendum 1, IEEE Computer Society and the IEEE Microwave Theory and Techniques Society, dated Feb. 28, 2006, pp. 1-822.

* cited by examiner

FIG.7

| MS MAC ADDRESS | RS | BASIC CID | PRIMARY CID |
|---|---|---|---|
| MS#1 | RS#2 | 3 | 51 |
| MS#2 | DIRECT | 8 | 56 |
| ⋮ | ⋮ | ⋮ | ⋮ |
| MS#n | RS#1 | 20 | 68 |

RADIO BASE STATION, RELAY STATION AND RADIO COMMUNICATION METHOD

BACKGROUND OF THE INVENTION

1. Field of the Invention

The present invention relates to a radio base station, a relay station, using radio communication, and a radio communication method. The present invention is especially advantageous when it is applied to a case where a radio communication system prescribed by IEEE802.16 is used as a base system and thereto a relay station is added.

2. Description of the Related Art

A radio communication system carrying out communication with the use of a radio channel, i.e., WCDMA, CDMA2000 or such, as a typical example, currently spreads worldwide. In such a radio communication system, a plurality of radio base stations are set for a service area, and each radio terminal carries out communication with another communication apparatus (i.e., another communication terminal) with the use of any of the radio base stations. At this time, an overlapping area is provided with an adjacent service area in which an adjacent base station can carry out radio communication, and, handover to the adjacent radio base station is available when a radio environment degrades.

Further, as a radio communication method, for example, code division multiplexing, time division multiplexing, frequency division multiplexing, OFDMA or such, is applicable. In these methods, generally speaking, a plurality of radio terminals can connect to a single radio base station simultaneously.

However, even within the service area in which the radio base station can carry out radio communication, high speed communication may not be available in a place close to the area boundary, since the radio environment may not be satisfactory. Further, even within the area, radio signal propagation may be obstructed by a cause such as a building shade. Thus, an area (so-called dead zone) in which satisfactory radio connection with the radio base station is difficult may occur.

In order to solve the problem, a plan in which a relay station is disposed in the service area of the radio bases station, and radio communication is available between the radio terminal and the radio base station with the use of the relay station, has been proposed.

Especially, in a task group of 802.16j, introduction of such a relay station (RS) is currently studied.

As to the above-mentioned IEEE802.16, details are disclosed in, for example, IEEE Std 802.16TM-2004 and IEEE Std 802.16eTM-2005.

SUMMARY OF THE INVENTION

In the related art described above, the radio terminal can carry out radio communication with the base station directionally or with the use of the relay station. In this case, it is necessary to determine how the radio terminal utilizes the relay station.

An object of the present invention is to provide a system and a procedure for efficiently utilizing the relay station.

Another object of the present invention is to prevent management of the radio terminal by the radio base station from being obstructed by the existence of the relay station.

Further another object of the present invention is to prevent degradation in the transmission efficiency otherwise degrading due to a fact that a radio communication environment between the radio base station and the relay station may not necessarily equal to that between the relay station and the radio terminal.

Other than these objects, advantages which may be obtained from respective configurations of preferred embodiments described later, which are not obtained from the related art, may be regarded as further objects of the present invention.

(1) According to the present invention, a relay station is used, which has:

a reception unit receiving a signal sequence indicating a connection request, from a predetermined signal sequence group;

a control unit generating a ranging request message indicating that a radio terminal newly requesting connection exists; and a transmission unit transmitting the ranging request message to a radio base station.

(2) Further, according to the present invention, a radio base station is used, which has:

a reception unit receiving a ranging request message, transmitted from a relay station in response to reception of a signal sequence indicating a connection request from a radio terminal;

a control unit determining in response to the reception whether or not connection with the radio terminal is to be newly permitted, and generating a ranging response message including the determination result; and a transmission unit transmitting the ranging response message to the relay station.

(3) Further, according to the present invention, a relay station is used, which has:

a reception unit receiving a signal sequence indicating a connection request, from a predetermined signal sequence group;

a control unit generating reception information of the signal sequence received by the reception unit or correction value information indicating a deviation from a predetermined criterion calculated upon the reception of the reception unit; and a transmission unit transmitting the reception information or the correction value information to a radio base station.

(4) Further, according to the present invention, a relay station is used, which has:

a reception unit receiving a first ranging request message including an identifier of a radio terminal, from the radio terminal;

a control unit generating in response to the reception a second ranging request message including the identifier of the radio terminal; and a transmission unit transmitting the second ranging request message to a radio base station.

(5) Preferably, the identifier included in the second ranging request message may be stored in a payload or a header.

(6) Further, according to the present invention, a radio base station is used, which has:

a reception unit receiving from a relay station a ranging request message;

a control unit storing identification information of a radio terminal included in the ranging request message, and generating a ranging response message corresponding to the ranging request message; and a transmission unit transmitting to the relay station the ranging response message.

(7) Preferably, the control unit may include in the ranging response message a connection identifier allocated to the radio terminal; and the connection identifier is stored with a correspondence to the identifier of the radio terminal.

(8) Further, according to the present invention, a radio communication method is used, which has the steps of:

in a relay station, receiving a first ranging request message including an identifier of a radio terminal, from the radio terminal, generating a second ranging request message to which the identifier of the radio terminal is added, and transmitting the second ranging request message to a radio base station; and in the radio base station, receiving the second ranging request message, storing the identifier of the radio terminal included in the second ranging request message, generating a ranging response message corresponding to the second ranging request message, and transmitting the ranging response message to the relay station.

(9) Further, according to the present invention, a radio communication method is used, which has the steps of:

in a relay station, receiving a signal sequence indicating a connection request from a radio terminal, generating a ranging request message indicating that the radio terminal newly requesting connection exits, and transmitting the ranging request message; and in a radio base station, receiving the ranging request message, determining whether or not to newly permit a connection of the radio terminal, generating a ranging response message including the determination result, and transmitting the ranging response message.

(10) Preferably, the ranging request message may be transmitted to the radio base station when the reception of the signal sequence meets a predetermined criterion, and may not be transmitted when the predetermined criterion is not met.

(11) Further, according to the present invention, a radio communication method is used, which has the steps of:

in a relay station, receiving a signal sequence indicating a connection request from a radio terminal; and in the relay station, determining whether or not to newly permit connection with the radio terminal, generating a ranging response message including the determination result, and transmitting the ranging response message to the radio terminal.

(12) Further, according to the present invention, a relay station is used, which has:

a reception unit receiving a signal sequence indicating a connection request from a radio terminal;

a control unit determining whether or not to newly permit connection with the radio station, and generating a ranging response message including the determination result; and a transmission unit transmitting the ranging response message to the radio terminal.

(13) Further, according to the present invention, a radio base station is used, which has:

a control unit generating key information used for communication between a radio terminal and the radio base station; and a transmission unit transmitting the key information to the radio terminal and a relay station.

(14) Preferably, the key information may include a shared key and an authentication key.

(15) Preferably, the control unit may transmit the key information after encrypting it with such a key that the relay station can decrypt it.

(16) Further, according to the present invention, a relay station is used, which has:

a reception unit receiving a message transmitted from a radio base station;

a processing unit modifying data obtained from decrypting encrypted data transmitted between a radio terminal and the radio base station, with key information included in the message; and a transmission unit transmitting the thus-modified data.

(17) Preferably, the key information may include shared key information, and the data transmitted by the transmission unit may include data obtained from encryption with the use of the shared key information after the modification.

(18) Further according to the present invention, a relay station is used, which has:

a reception unit receiving a message transmitted from a radio base station;

a processing unit modifying data to which authentication data is added, transmitted between a radio terminal and a radio base station, and adding the authentication data to the thus-modified data with the use of authentication key information included in the message; and a transmission unit transmitting the data to which the authentication data is added by the processing unit.

According to the present invention, it is possible to provide the system and the procedure in which the relay station can be efficiently used.

Further, according to the present invention, management of the radio terminal by the radio base station can be made smoothly even with the existence of the relay station.

Further, according to the present invention, it is possible to prevent degradation in the transmission efficiency otherwise degrading due to a fact that a radio communication environment between the radio base station and the relay station may not necessarily equal to that between the relay station and the radio terminal.

BRIEF DESCRIPTION OF THE DRAWINGS

Other objects and further features of the present invention will become more apparent from the following detailed description when read in conjunction with the accompanying drawings:

FIG. 7 shows a management table of the MS (1);

DETAILED DESCRIPTION OF THE PREFERRED EMBODIMENTS

With reference to figures, embodiments of the present invention will be described. It is noted that, although separate embodiments are described, for the sake of convenience, they may be combined and thus, with advantages from the combination, the advantages may be further improved.

[a] Description of First Embodiment:

In a first embodiment of the present invention, a relay station transmits a signal after processing a signal received from a radio terminal, to a radio base station.

In this configuration, the relay station positively functions in communication between the radio terminal and the radio base station. For example, a signal which is not necessarily required to be transmitted to the radio base station is not transmitted to the radio base station. Thus, management of the radio terminal by the radio base station can be carried out smoothly. Further, signal processing which can be carried out by the relay station is carried out by the relay station itself. Accordingly, it is possible to reduce a processing load of the radio base station. Further, the radio base station can manage as to which relay station is used by the radio terminal.

Figure 1:
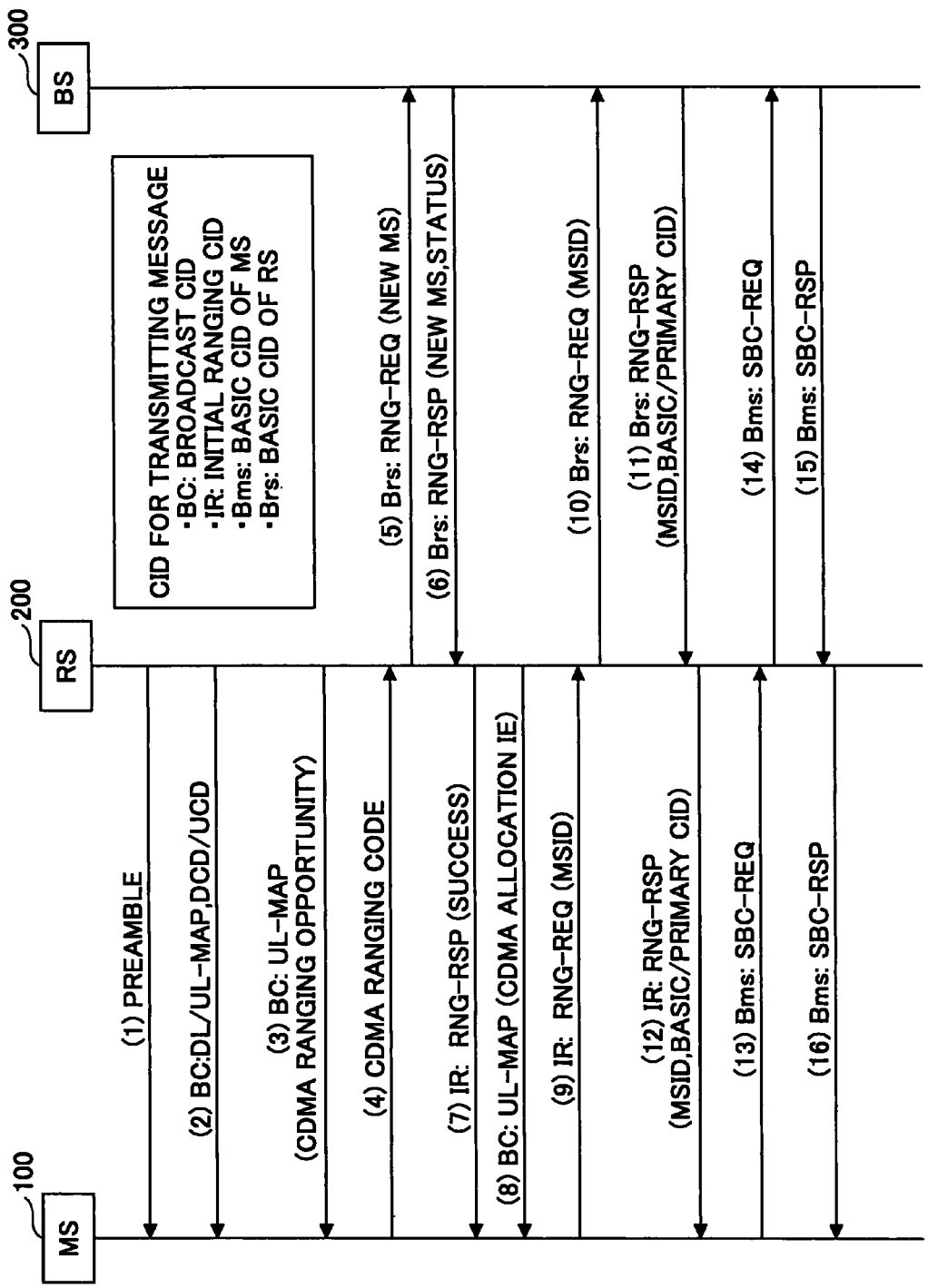
FIG. 1 shows an example of a ranging and basic capability registration sequence.

"Basic System Configuration":

FIG. 1 shows a processing sequence for a case where the relay station is newly introduced to a radio communication system prescribed in IEEE802.16, as one example of a radio communication system including the radio base station and the radio terminal for carrying out radio communication. This sequence may also be applied to another type of radio communication system.

First, a basic function of each apparatus will be described.

In FIG. 1, a BS (Base Station) 300 denotes a radio base station, which is one of radio base stations disposed in an area in which the present radio communication system provides a radio communication service. Accordingly, there are other radio base stations providing other radio areas, which are not shown, adjacent to the area provided by the present radio base station.

In this radio communication system, transmission/reception channels (i.e., uplink and downlink channels) of an MS 100 and an RS 200 are controlled by transmission/reception channel definition data, called MAP data.

The MAP data includes, for example, transmission/reception timing, sub-channel information used for transmission/reception, code values indicating a modulation method and an error correction coding method, and a CID (Connection ID). The MS 100 and the RS 200 determine whether or not connection is relevant to themselves, from the CID, and, carry out radio communication (transmission or repetition of a radio signal) in the transmission/reception timing, with the sub-channels corresponding to the CID. Accordingly, it may be said that the MAP data defines a transmission/reception region. It is noted that, data of the MAP data, defining the communication region of the uplink direction (from the MS 100 to the RS 200 (or the BS 300), is referred to as UL (Up Link)-MAP data, while data of the MAP data, defining the communication region of the downlink direction (from the BS 300 to the RS 200 (or the MS 100)), is refereed to as DL (Down Link)-MAP data.

The MS 100 denotes a radio terminal, which exists in the radio area provided by the BS 300, and thereby, can communicate with the BS 300. It is noted that the radio terminal is allowed to carry out communication with changing a location (for example, upon moving). Then, when it moves to under another base station providing adjacent another radio area, handover processing is carried out and thereby, radio communication can be continued. The MS 100 can communicate directly with the BS 300. However, in this example, the MS 100 carries out radio communication with the BS 300 with the use of the RS 200.

The RS 200 denotes a relay station, which is disposed so that it can communicate with the BS 300, transmits a signal to the MS 100 based on a signal received from the BS 300, or, reversely, transmits a signal to the BS 300 based on a signal received from the MS 100, whereby the above-mentioned dead zone can be eliminated.

"Ranging and Basic Capability Registration":

Next, with reference to FIG. 1, a ranging and basic capability registration sequence for starting connection of the radio terminal with the radio base station will be described. FIG. 1 shows processing for when so-called network entry is carried out.

It is noted that both the BS 300 and the RS 200 generate the MAP data, respectively, and transmit the same. That is, the BS 300 transmits the MAP data for defining a transmission/reception region of radio communication with the MS 100 belonging thereto and with the RS 200 with which radio communication is directly carried out. Further, based on the data to transmit/receive, the BS 300 carries out scheduling, and generates the MAP data according to the scheduling.

The RS 200 generates the MAP data based on scheduling for defining a transmission/reception region of radio communication with the MS 100 belonging thereto, and transmits the same.

The transmission/reception region defined by the MAP data of the BS 300 and the transmission/reception region defined by the MAP data of the RS 200 are separated by timing, by frequencies, by spread codes or such, and thus, have such a relationship that radio communication can be carried out without obstruction to one another.

In FIG. 1, (1), the RS 200 transmits a known signal (i.e., a preamble signal) as a synchronization signal. Then, subsequent to the preamble signal, MAP data (including both UL- and DL-MAP data) is used. Also, user data is transmitted from the RS 200 in the transmission region defined by the DL-MAP data, to the MS 100 (2).

The MS 100 receives the preamble signal thus transmitted by the RS 200, and establishes synchronization to a radio frame which the RS 200 has transmitted. It is noted that, the MS 100 should not distinguish between the RS 200 and the BS 300. This is because, the processing for detecting the preamble signal and subsequently carrying out transmission/reception according to the MAP data may be the same between the case of radio communication with BS 300 and the radio communication with the RS 200.

The MS 100 receives MAP data (DL and UL) based on the preamble (2), detects the transmission region defined by the MAP data, and receives DCD and UCD transmitted through the transmission region. It is noted that the DCD and the UCD are data broadcasted, and thus, BC which is a broadcast connection ID is stored in the definition information of the transmission region in the DL-MAP data and in the transmission region. In the figures, BC, IR, Bms and Brs, provided at a top of each message, denote the connection IDs used for transmission. That is, BC, IR, Bms and Brs denote a broadcast CID, an initial ranging CID, a MS's basic CID and a RS's basic CID, respectively.

As a function of the DCD (Downlink Channel Descriptor), it defines a relationship between code values DIUC (Downlink Internal Usage Code) indicating a downlink modulation method and an error correction encoding method (including an encoding rate), and the downlink modulation method and the error correction encoding method (including an encoding rate) themselves. For example, DIUC=3 may define 16QAM, a convolution code and an encoding rate of 3/4. Thereby, merely by defining DIUC=3 in the DL-MAP, it is possible to notify the RS 200 or the MS 100 that the region is encoded and modulated by 16QAM, the convolution code and the encoding rate of 3/4. Similarly, UCD (Uplink Channel Descriptor) defines a relationship between code values UIUC (Uplink Internal Usage Code) indicating an uplink modulation method and an error correction encoding method (including encoding rate), and the uplink modulation method and the error correction encoding method (including encoding rate) themselves.

Thus, by receiving the definitions of DIUC and UIUC from DCD and UCD, it becomes possible that the MS 100 or RS 200 can interpret the DL-MAP or UL-MAP. The MS 100 obtains the transmission region by which transmission of a ranging code indicating a request for connection of the MS 100 is allowed, by receiving the UL-MAP data in (2) or by receiving the UL-MAP data included in the subsequent frame (3). The ranging region is a region for transmitting a predetermined signal (i.e., a CDMA ranging code) from the MS 100. The RS 200 notifies of this region to the MS 100 with the MAP data. The ranging region may be one including a plurality of regions, for example, and thus, such a manner is allowed that a first MS transmits a predetermined signal in a first region while a second MS transmits a predetermined signal in a second region.

As the CDMA ranging code (i.e., a signal sequence), for example, it is preferable to selectively use, from a predetermined number or plurality of codes (i.e., a signal sequence group). For example, upon transmission of a code, the MS 100 selects one of the plurality of codes, and transmits the same. Upon the selection, it is possible to reduce a possibility that the same code is selected, even when a plurality of MSs share the codes, when the code is selected randomly.

After obtaining the transmission region for the ranging signal, the MS 100 selects any of the regions (for example, a first region) from among the ranging regions, and transmits the selected CDMA code (for example, a code 1) in the selected region (4).

The CDMA ranging code is a CDMA code for initial ranging. On the other hand, when the MS 100 comes from another BS 300 in a handover manner, a CDMA code for HO ranging is transmitted.

The RS 200 receives the CDMA ranging code transmitted in the transmission region of the ranging signal, and stores the code reception information such as the reception timing (for example, which region is used), a type of the code (in this example, the code 1, mentioned above) and so forth. Further, other than the code reception information, a deviation of the frequency (sub-band) upon the code reception from a standard frequency, a deviation of the reception power from a standard reception power, a deviation of the reception timing from standard timing (i.e., the transmission region of the ranging region defined by the MAP data) and so forth are measured, and are stored as correction values (i.e., correction values of transmission parameters of the MS 100).

Then the RS 200 transmits an RNG-REQ message to the BS 300 (5).

As transmission timing of the RNG-REQ message, a region in which data transmission is possible from the RS 200 to the BS 300, defined by the UL-MAP transmitted by the BS 300, is used. That is, a communication link (MMR link) using the data transmission/reception region between the BS 300 and the RS 200, defined by the BS 300, is used. However, in this case, the MMR link in the uplink direction is used. Further, as to the MMR link, different regions should be preferably designated to respective RSs, for the purpose of avoiding collision.

As the contents of the RNG-REQ message, a message requesting ranging may be used. Specifically, a basic CID of the RS 200 as a connection ID (for example, a CID, designated by the BS 300, which is an ID for distinguishing from the radio terminal and the other relay stations belonging to the BS 300, i.e., Brs) may be used, and the message may include data (i.e., New MS) for notifying that entry of a new MS 100 is made (i.e., a new MS 100 exists which requests connection).

It is preferable that the above-mentioned New MS is data (i.e., the number) which is changed (incremented) each time the RNG-REQ message including New MS is transmitted. For example, when the RS 200 receives the code 1 in the first region of the ranging region, subsequently receives a code 2 in the second region, and transmits RNG-REQ messages for the respective codes, the transmission may be made with such a setting of SN=1, and then, SN=2, respectively.

The example of the contents of the message transmitted in (5) has been thus described. Preferably, this message may be transmitted to the BS 300 when the deviations of the frequency, the reception power level and the timing upon the code reception lie within predetermined ranges (i.e., no correction is required; a "success" status). Otherwise, the message may not be transmitted to the BS 300. This is because, when the error is large, the MS 100 should be made to again transmit the CDMA code, then the RNG-REQ message should be generated based on the re-transmitted CDMA code, and, should be transmitted to the BS 300. Thus, it is possible to reduce messages to be transmitted to the BS 300, and thus, the processing load of the BS 300 can be reduced.

The BS 300 receiving the RNG-REQ can determine from the CID the relay station which has thus transmitted the message. Then, since the message indicates that the entry of the new MS 100 is made, the BS 300 refers to the communication resources of the BS 300 itself (i.e., radio channels, radio communication units and so forth), RS busy resource conditions and so forth, which are separately managed and stored, and, determines whether or not the new MS 100 can be accepted.

The determination result is then transmitted to the RS 200 as a RNG-RSP message (6). The transmission region to be used there is the MMR link defined by the MAP data of the BS 300 described above. As the CID, Brs can be used.

In this RNG-RSP message, for example, a "success" status may be included when the MS 100 can be accepted, while an "abort" status may be included when the MS 100 cannot be accepted. If necessary, the New MS, the same as the New MS in the RNG-REQ received from the RS, may be further included.

The RS 200 has having received the RNG-RSP message from the BS 300 continues the ranging processing of the MS 100 when the status thus notified of is "success". That is, when a correction is required for the reception frequency, the reception power level and the reception timing of the ranging code which the RS 200 has received, the RS 200 transmits RNG-RSP ("continue" status) as a response message including the corresponding correction values.

The correction values are those obtained upon the reception of the ranging CDMA code, which is stored in the above-mentioned example. In order to search for the correction values, the New MS may be used as a search key when the correction values are stored with correspondence to the New MS. Any other identification information may also be used as a search key.

When no correction is required, the RS 200 transmits RNG-RSP ("success") as a response message (7).

On the other hand, when the status notified of from the BS 300 is "abort", the RS 200 transmits to the MS 100, RNG-RSP of an "abort" status. The MS 100 which has thus received the RNG-RSP of the "abort" status stops the connection processing for the RS 200, and then, inquires into another BS or another RS. That is, the MS 100 tries to receive another preamble.

It is noted that, in such a case that the BS's resources are sufficient, the RS 200 may omit the step of transmitting the RNG-REQ to the BS 300 notifying existence of the MS 100 which requests connection, in response to the reception of the ranging code. That is, the transmission/reception with the BS 300 in (5), (6) may be omitted, and RNG-RSP ("continue" status) or RNG-RSP ("success" status) may be transmitted in (7). Thereby, an increase in the processing speed can be achieved. The BS 300 may notify the RS 200 of the number of MSs which can be processed through the MMR link, and the RS 200 may omit the processing as mentioned above, when this number is not actually exceeded.

It is noted that the RNG-RSP message is transmitted in the transmission region which is made to have correspondence to IR (Initial Ranging) as a connection ID in the DL-MAP data. The IR may be used as one unique ID used for ranging processing. At this time, since RNG-RSP can be received by all the radio terminals which have transmitted the CDMA ranging code, it is preferable that the reception information of the CDMA ranging code is stored in the RGN-RSP message, and thus the transmission destination of the RNG-RSP is specified. It is noted that, in the examples mentioned below, the RS 200 stores the reception information of the CDMA ranging code, search may be made with the New MS or such which may be used as a key, and, the thus-obtained reception information may be transmitted.

The MS 100 having received the RNG-RSP adjusts the frequency, transmission power and timing according to the correction values included in the RNG-RSP when the status is "continue", and again, the MS 100 transmits a ranging CDMA code to the RS 200 (not shown). When the status is "success", the MS 100 receives the CDMA allocation IE included in the UL-MAP data included in the same frame or a subsequent frame.

As the CDMA allocation IE included in the UL-MAP data, BC is used as a connection ID. Therefore, all the radio terminals belonging to the RS 200 can receive it. Accordingly, the MS 100 carries out matching the type of the code (code 1) and the timing (region 1) which the MS 100 itself has transmitted, with the reception information of the code stored in the CDMA allocation IE. Then, when the matching results in agreement, the MS 100 receives it as a message transmitted for itself, and detects the transmission region defined by the CDMA allocation IE. On the side of RS 200, a correspondence relationship between the transmission region which the RS 200 has allocated and the identification information of the MS 100 such as New MS or such, is stored.

The MS 100 who thus has received the CDMA allocation IE transmitted for itself, transmits an RNG-RSP message including the MAC address (MSID) which is identification information for the MS 100, to the RS 200 via the transmission region detected as mentioned above (9). It is noted that, as a connection ID, the IR is used, which is also stored in the RNG-RSP message.

When receiving the RNG-RSP message designated by the CDMA allocation IE via the transmission region, the RS 200 specifies the New MS corresponding to the transmission region, and, generates and transmits an RNG-REQ message to the BS 300.

In this stage, the identification information (MSID) of the MS 100 has been obtained. Accordingly, as a result of the MSID being included in the RNG-REQ message, it can be seen that the RNG-REQ message transmitted by the RS 200 corresponds to a ranging request from the MS 100. Preferably, the New MS should be further included there.

The RS 200 adds Brs which is the basic CID of the RS 200 to the information to obtain the RNG-REQ message, and transmits the same to the BS 300 via the MMR link (10).

When receiving the RNG-REQ message from the RS 200, the BS 300 identifies the RS 200 which has transmitted the message, from the CID (Brs) included in the header thereof. Further, the BS 300 stores the MAC address of the MS 100 (MSID) included in the payload part, with association to the RS 200. Thereby, the BS 300 can manage as to which RS the MS 300, identified by the MSID, belongs to. From the New MS included in the RNG-RSP, it is possible to check whether or not the MS, the same as the MS for which the status "success" has been given in (5), (6), has transmitted the RNG-REQ. When the New MS does not correspond to the MS 100, from which the message has been received (5), the subsequent processing may be rejected and the current processing may be terminated.

The BS 300 having received the RNG-RSP message further creates a basic CID and a primary CID for the MS 100, adds the MSID, and thus, generates an RNG-RSP message, which is then returned to the RS 200. At this time, as a connection ID, Brs may be used. Then, with the use of the MMR link, the same as the above, the RNG-RSP message is transmitted via the data region (11).

The RS 200 which has thus received the RN G-RSP message including the basic CID and the primary CID for the MS 100, from the BS 300, converts the connection ID in the header into IR, and transfers the RNG-RSP message, having been thus converted, to the MS 100 (12). It is noted that the connection ID is stored in the DL-MAP data together with the definition information of the corresponding data transmission region, and also, it is stored in the header part of the data stored in the transmission region.

Based on IR which is the connection ID of the DL-MAP data, the MS 100 receives the corresponding data transmission region, and then, the MS 100 receives the RNG-RSP message including the basic CID and the primary CID. Since the MSID is also stored, the MS 100 can easily determine that the message is one for itself.

After that, the MS 100 carries out processing for notifying of a capability of itself.

That is, with the use of the thus-obtained basic CID as the connection ID, the MS 100 transmits an SBC-REQ message to the RS 200. That is, the SBC-REQ message (including the basic CID) is transmitted via the transmission region designated as a region for transmission by the UL-MAP data (13).

The RS 200 having received the SBC-REQ message transfers the same with the basic CID of the MS 100 used as it is, to the BS 300 via the MMR link (14).

The BS 300 having received the SBC-REQ message generates an SBC-RSP message notifying the MS 100 of a function, from among those of the capability of the MS 100, thus notified of from the MS 100, which each of the MS 100, RS 200 and BS 300 can support. The SBC-RSP message is then transmitted to the RS 200 via the MMR link (15). At this time, the basic CID of the MS 100 is used as the connection ID. It is noted that, the contents which are thus notified of, are stored with correspondence to the MS 100, on the side of the BS 300.

Brs may also be used as the connection ID for the MMR link. In this case, it is preferable that information for identifying the MS 100 is stored in the message. As the information to store, for example, MSID, the basic CID of the MS 100 or such, may be used. From the information, the BS 300 can identify the MS 100, and thus, can identify the MS for which the capacity to use is determined. As another method, it is also possible to carry out transmission/reception ((14), (15)) of the messages using the MMR link with the use of another CID corresponding, in a one-to-one manner, to the basic CID of the MS 100.

The RS 200 transfers the SBC-RSP to the MS 100 (16). The basic CID may be used as the connection ID.

Thus, the ranging and basic capability registration sequence has been described. Thereby, the reception information of the code should not be transmitted to the BS 300. Thus, it is possible to prevent degradation in the channel efficiency. Further, management of the MS 100 by the BS 300 can be carried out easily.

It is noted that, in the process of relaying the messages between the MS 100 and the BS 300, the RS 200 may obtain the information included in the messages and store the same.

Thereby, not only the BS 300 but also the RS 200 can manage the MAC address (MSID) of the MS 100, the basic CID, the primary CID, and the support functions notified by the SBC-REQ and SBC-RSP messages.

Thereby, the RS 200 can properly select the modulation method and the error correction encoding method supported by the MS. Also, the RS 200 may transmit the stored contents in response to a query from the BS 300. Thus, the RS 200 can function as a backup apparatus.

"Processing Flow in RS, BS":

Next, processing flows in each apparatus will be described.

Figure 2:
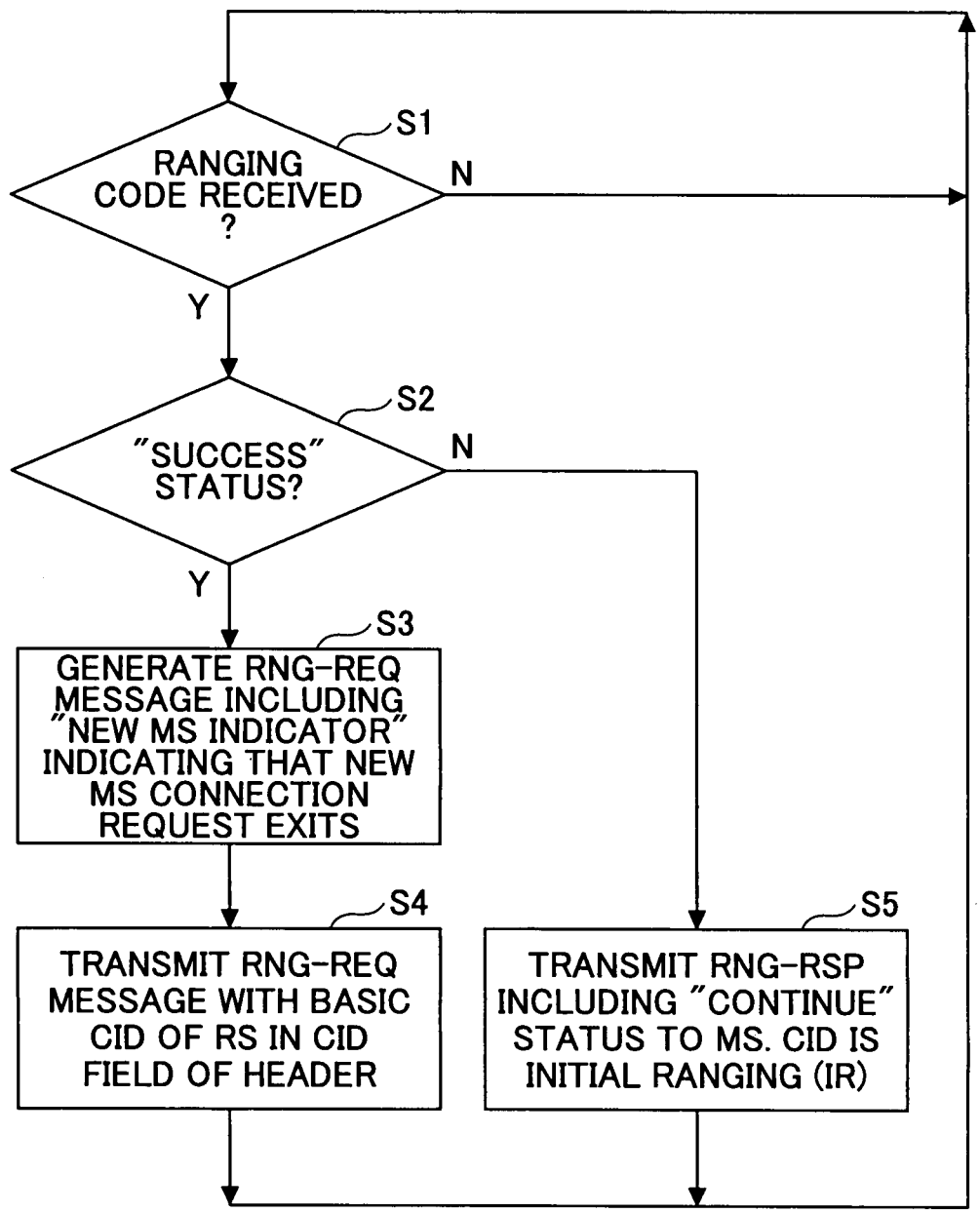
FIG. 2 shows a processing flow of a RS when receiving a ranging code from a MS.
Figure 3:
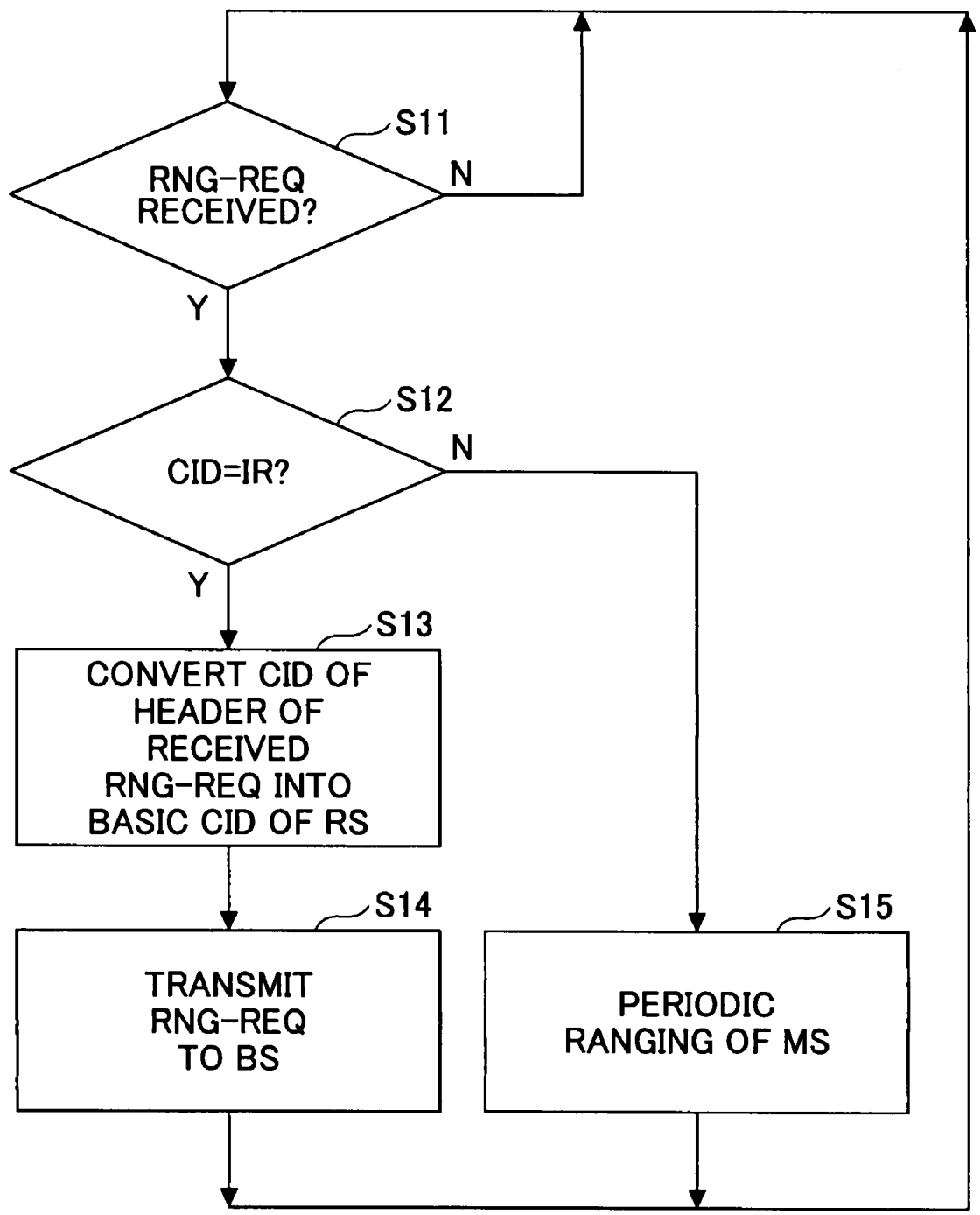
FIG. 3 shows a processing flow of a RS when receiving a ranging request from the MS.
Figure 4:
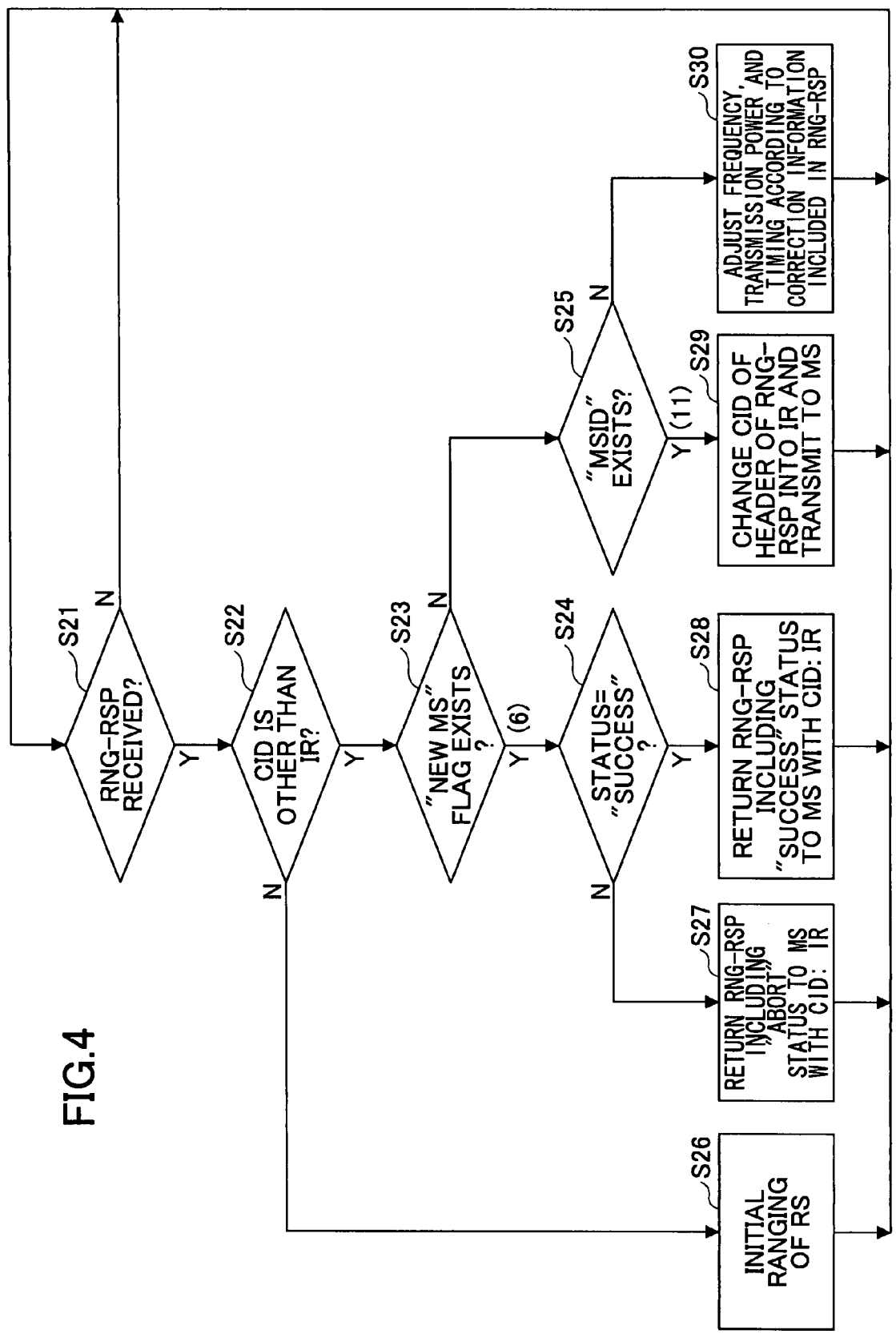
FIG. 4 shows a processing flow of the RS when receiving a ranging response from the BS.
Figure 5:
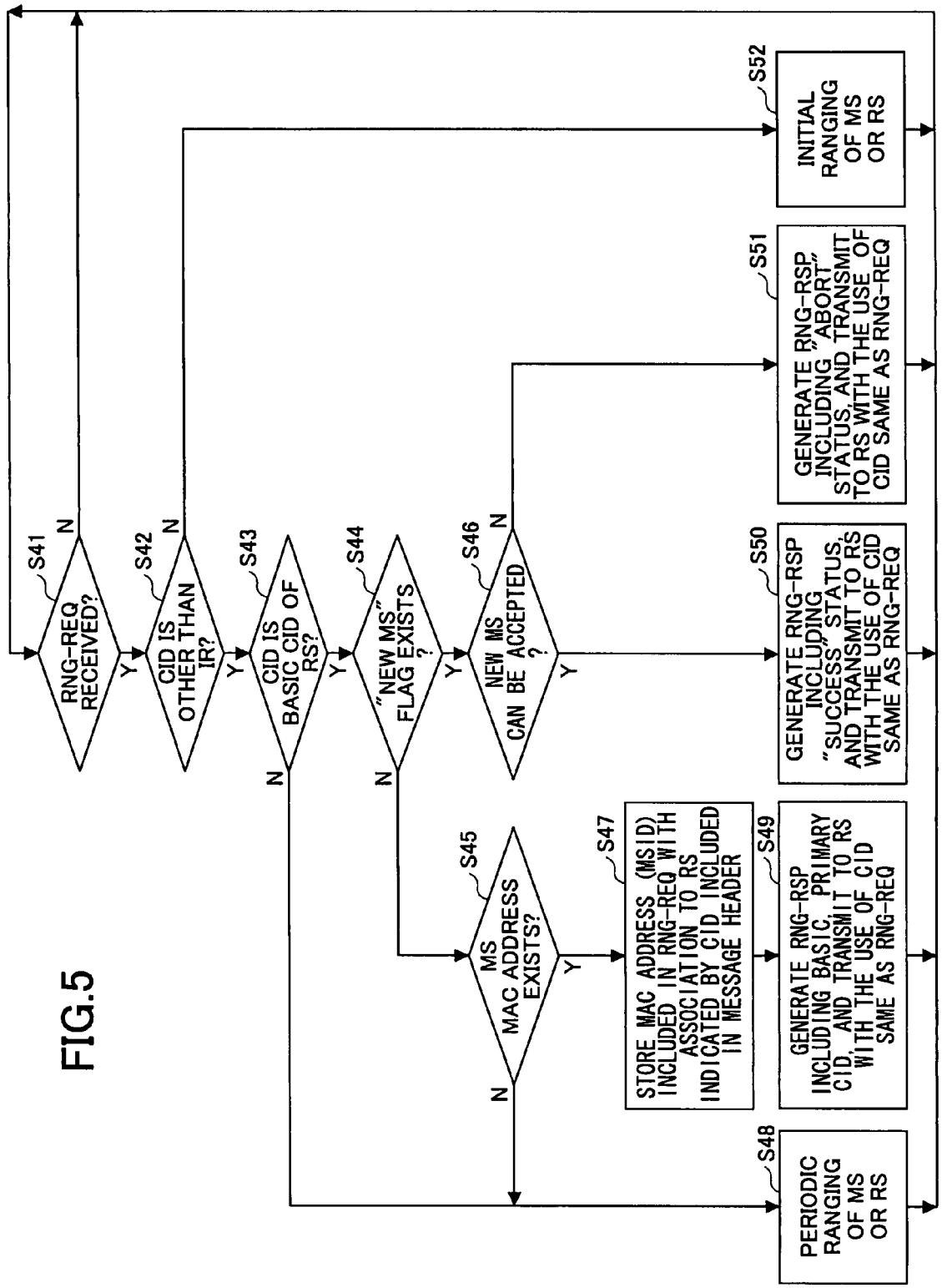
FIG. 5 shows a processing flow of the BS when receiving a ranging request.

FIG. 2 shows a processing flow of the RS 200 upon receiving the ranging code from the MS 100; FIG. 3 shows a processing flow of the RS 200 when receiving the RNG-REQ from the MS 100; FIG. 4 shows a processing flow of the RS 200 when receiving the RNG-RSP from the BS 300; and FIG. 5 shows a processing flow of the BS 300 when receiving the RNG-REQ.

Processing Flow of the RS 200 when Receiving the Ranging Code from the MS 100 (FIG. 2):

This processing flow is carried out by a control part of the RS 200.

The RS 200 determines whether or not to have received the ranging code from the MS 100 (S1). When the determination result is No, the RS 200 carries out subsequent reception again (S1). When the result is Yes, the RS 200 determines the status of code reception (S2). When the status is "success" (Yes), the RS 200 generates an RNG-REQ message including information "New MS" indicating that a new MS connection request exists (S3), and transmits the same to the BS 300 with the basic CID of the RS 200 added in the CID field of the header (S4).

When the result of S2 is No (not "success"), the RS 200 transmits an RNG-RSP message to the MS 100, including a status "continue" (S5). At this time, initial ranging (IR) is used as the CID.

Processing Flow of the RS 200 when Receiving the RNG-REQ from the MS 100 (FIG. 3):

This processing flow is mainly carried out by the control part of the RS 200.

The RS 200 determines whether or not to have received the RNG-REQ from the MS 100 (S11). When the result is No, next reception check is carried out (S11). When the result is Yes, it is determined whether or not the CID is IR (S12). When the result is No, periodic ranging processing of the MS 100 is carried out (S15). That is, instead of initial ranging being carried out first, a signal for correcting errors in the transmission power, the transmission timing, the transmission frequency and so forth, is generated, as ranging processing which should be carried out periodically after that, and the signal is transmitted to the MS 100.

When the result of S12 is Yes, the RS 200 converts the CID of the header of the received RNG-REQ message into the basic CID of the RS 200, and transmits the RNG-REQ message to the BS 300 (S13, S14). New MS may also be included in the message.

Processing Flow of the RS 200 when Receiving the RNG-RSP from the BS 300 (FIG. 4):

This processing flow is mainly carried out by the control part of the RS 200.

First, the RS 200 determines whether or not to have received the RNG-RSP (S21). When the result is No, next reception check is carried out again (S21). When the result is Yes, the RS 200 determines whether or not the CID is other than the IR (S22). When the result is the IR (No), the RS 200 carried out initial ranging processing of the RS 200 (S26).

When the result of S22 is Yes (for example, the CID is Brs), it is determined whether or not a "New MS" flag exists (S23). When the result is No, it is determined whether or not MSID exists (S25). When MSID exists (Yes), the CID of the header of the RNG-RSP is changed into the IR, and the RNG-RSP is transmitted to the MS 100 (S29). When MSID does not exist (No in S25), the RS 200 adjusts the frequency, transmission power and timing according to the correction information included in the RNG-RSP, as periodic ranging processing of the RS 200 itself (S30).

On the other hand, when the "New MS" flag exists (Yes in S23), it is determined whether or not the status is "success" (S24). When the status is "success" (Yes), the RNG-RSP including the status "success" is returned to the MS 100 (S28). When the status is other than "success" (No in S24), the RNG-RSP including of a status "abort" is returned to the MS 100 (S27).

Processing Flow of the BS 300 when Receiving the RNG-REQ (FIG. 5):

This processing flow is carried out mainly by a control part of the BS 300.

First, the BS 300 determines whether or not to have received the RNG-REQ (S41). When the result is No, the BS 300 carries out next reception check again (S41). When the result of S41 is Yes, it is determined whether or not the CID is other than the IR (S42). When the result is No (i.e., the CID is the IR), the BS 300 carries out initial ranging processing of the MS 100 or the RS 200 which the BS 300 communicates with directly (S52).

When the CID is other than the IR (Yes in S42), it is determined whether or not the CID is the basic CID of the RS 200 (S43). When the result is No, the BS 300 carries out periodic ranging processing of the MS 100 (S48).

When the CID is the basic CID of the RS 200 (Yes in S43), it is determined whether or not a "New MS" flag exits (S44). When the "New MS" flag exists (Yes), it is determined whether or not the new MS 100 can be accepted (S46). When it can be accepted (Yes), the BS 300 generates an RNG-RSP including a status "success", and transmits the RNG-RSP to the RS 200 with the use of the same CID as that of the RNG-REQ (S50). When the new MS 100 cannot be accepted (No in S46), the BS 300 generates an RNG-RSP including a status "abort", and transmits the RNG-RSP to the RS 200 with the use of the same CID as that of the RNG-REQ (S51).

When no "New MS" flag exists (No in S44), the BS 300 determines whether or not the MS MAC address (MSID) exists (S41). When MSID does not exist (No), the BS 300 carries out periodic ranging processing of the RS 200. When MSID exists (Yes in S41), the BS 300 stores the MAC adders (MSID) included in the RNG-REQ, with association to the RS 200 expressed by the CID included in the header of the message (S47). Then, the BS 300 generates an RNG-RSP including the basic CID and the primary CID, and transmits the same to the RS 200 with the use of the same CID as that of RNG-REQ (S49).

Figure 6:
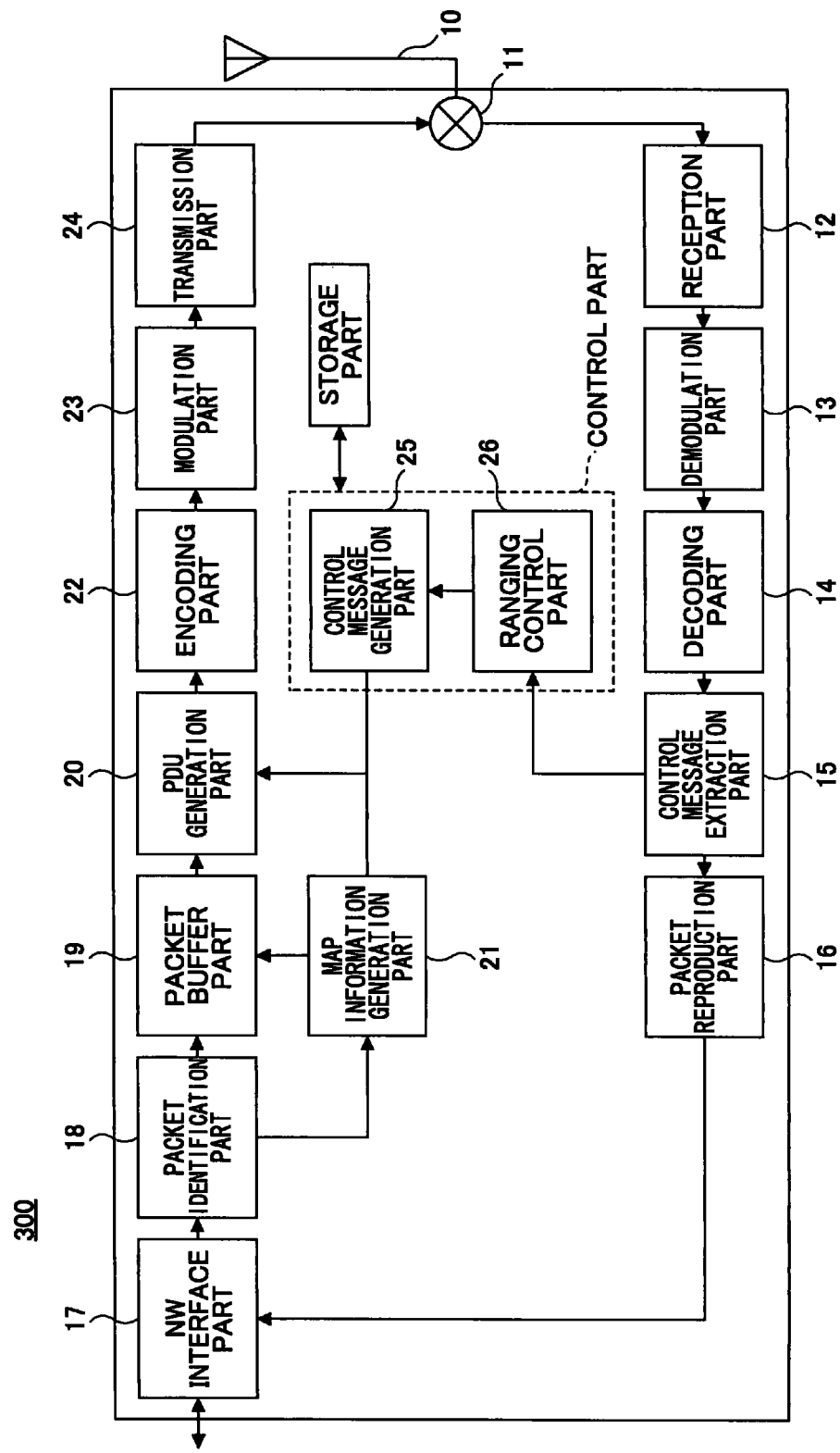
FIG. 6 shows a block configuration example of the BS.

"Configuration of Each Apparatus":

FIG. 6 shows a block configuration of the BS 300.

In FIG. 6, 10 denotes an antenna for transmission/reception of radio signals with the RS 200 or the MS 100; 11 denotes duplexer for the antenna 10 to be shared for transmission/reception; 12 denotes a reception part; 13 denotes a demodulation part for demodulating the reception signal; 14 denotes a decoding part for decoding the demodulated reception signal; 15 denotes a control message extraction part extracting control data from the reception signal to give it to a ranging control part 26, and also, transferring data such as user data to a packet reproduction part 16; 16 denotes the packet reproduction part generating a packet from the data transferred from the control message extraction part 15 to give it to a NW interface part 17.

17 denotes the NW interface part for providing an interface (in this example, for packet communication) with a routing apparatus (not shown; which is connected to a plurality of radio base stations, and carries out data forwarding control); 18 denotes a packet identification part, which identifies an IP address included in packet data received through the NW interface part 17, identifies a destination MS 100 based on the IP address (for example, a correspondence between IP address data and the MS's ID being previously stored, and, ID of the corresponding MS being obtained), and also, obtains QoS information corresponding to the ID (QoS being also previously stored with correspondence to the ID), gives the QoS information to an MAP information generation part 21 to request it to allocate a band, and stores the packet data received from the NW interface part 17 in a packet buffer part 19.

21 denotes the MAP information generating part which, in response to the band allocation request, determines a communication route by searching with the MS's ID as a key (or determines a relay station to use), generates MAP data setting a mapping area according to the QoS in any of the downlink data transmission regions, and also, gives instructions to a PDU generation part 20 for configuring a radio frame according thereto.

20 denotes the PDU generation part which generates a PDU such that MAP data and transmission data are stored in respective regions of a radio frame created based on a synchronization signal (preamble), and gives it to an encoding part 22. 22 denotes the encoding part; 23 denotes a modulation part; and 24 denotes a transmission part. The encoding part 22 carries out encoding processing such as error correction enclosing or such on the PDU data, the modulation part 23 modulates the thus-obtained data, and the transmission part 24 transmits the thus-modulated data as a radio signal via the antenna 10.

25 and 26 denote a control message generation part and the ranging control part, respectively, included in the control part of the BS 300 which carries out control of the respective parts of the BS 300.

The control part is connected with a storage part, in which various sorts of data the BS 300 should store is stored. For example, capability information determined for each MS, information as to whether or not MS should be directly communicated with, and further, information as to which RS is used to communicate with MS, and so forth, is stored. Further, the storage part is used for managing busy conditions of the BS and RS resources.

The control message generation part 25 generates various sorts of control messages according to instructions from the ranging control part 26, and gives them to the PDU generation part 20 as transmission data. Further, for the purpose of ensuring transmission regions, a request for ensuring the transmission regions is made to the MAP information generation part 21. At this time, also information required for creating the MAP data (i.e., connection IDs and so forth) is given to the MAP information generation part 21.

26 denotes the ranging control part, which analyses the control message (for example, RNG-REQ) extracted by the control message extraction part 15, analyses the CID included in the message header, and requests the control message generation part 25 to generate RNG-RSP and transmit the same.

When the CID is one for initial ranging (IR), this means a ranging request message from the MS or RS belonging to the BS 300. When correction of the frequency, transmission power and timing of MS is not required, it is notified to the control message generation part 25 to generate an RNG-RSP including the MAC address included in the RNG-REQ, the "success" status, the basic CID, the primary CID and so forth, is generated, and transmit it with CID=IR.

On the other hand, when the above-mentioned correction is required, it is notified to the control message generation part 25 to generate an RNG-RSP including the MAC address included in the RNG-REQ, the "continue" status and necessary correction information, and transmit the same with CID=IR.

When the CID is not for IR, but is the basic CID of the MS, periodic ranging of the MS is carried out. The same as the above-mentioned case of the IR, it is notified to the control message generation part 25 to generate an RNG-RSP including contents according to whether or not the correction is required, and transmit the same with the use of the basic CID of the RNG-REQ.

When the CID is not for IR but is the basic CID of the RS, processing to carry out differs according to whether or not a "New MS" indicator exists in the payload part of the RNG-REQ message.

When the "New MS" indicator does not exist, processing to carry out defers according to whether or not the MS MAC address (MSID) exists. When the MS MAC address (MSID) does not exist, periodic ranging processing of the RS is carried out. On the other hand, when the MS MAC address is included, this massage that, the received RNG-REQ is one transmitted from the MS, and then, is relayed by RS. At this time, the MS MAC address included in the RNG-REQ and the RS's basic CID included in the header of the RNG-REQ are managed with association to one another, so that the RS via which the MS is connected can be identified. Next, it is notified to the control message generation part 25 to generate an RNG-RSP message including the basic CID and the primary CID to be allocated to the MS, and transmit it to the RS with the use of the basic CID of the RS. An MS management table is used to manage association between the MS and the RS, and the MS's basic CID and the primary CID.

FIG. 7 shows an example of the MS management table.

This shows a part of the contents of the above-mentioned storage part.

As shown in FIG. 7, the MS management table manages and stores information indicating whether or not communication via the RS is carried out with correspondence to the MS's MAC address (MSID), information indicating which RS is used when the RS is used, the basic CID and the primary CID.

When the "New MS" indicator exists, it is determined whether or not the new MS can be accepted. Whether or not the new MS can be accepted can be determined from busy conditions of various sorts of resources, such as the radio resource busy condition, the management table busy condition, and so forth. When the new MS can be accepted, it is notified to the control message generation part 25 to generate an RNG-RSP including a "success" status, and transmit it to the RS with the use of the same CID as that of the RNG-REQ. On the other hand, when the new MS cannot be accepted, it is notified to the control message generation part 25 to generate an RNG-RSP including an "abort" status, and transmit it to the RS with the use of the same CID as that of the RNG-REQ.

Figure 8:
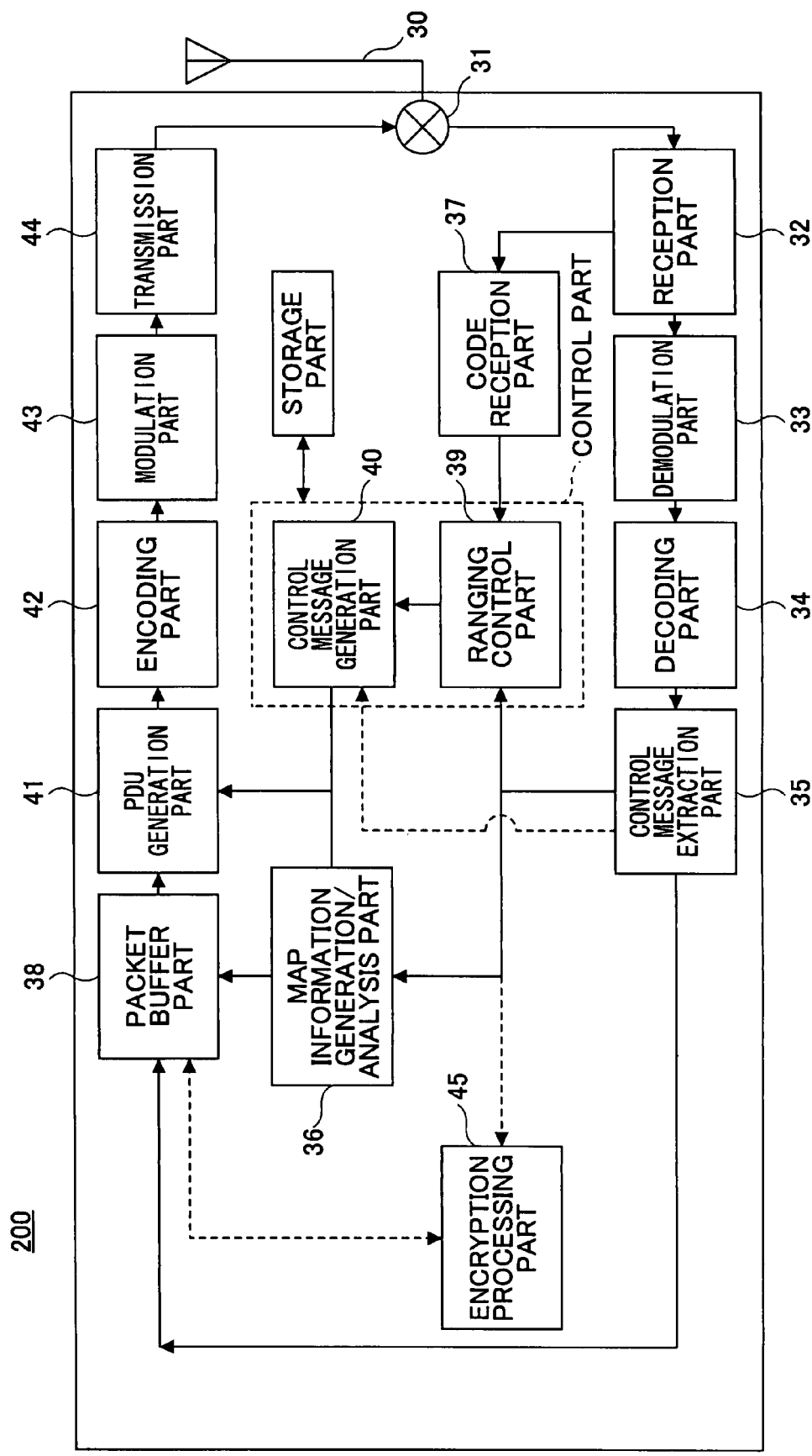
FIG. 8 shows a block configuration example of the RS.

FIG. 8 shows a block configuration of the RS 200.

In FIG. 8, 30 denotes an antenna for transmission/reception of radio signals with the BS or the MS; 31 denotes a duplexer for the antenna 10 to be shared for the transmission/reception; 32 denotes a reception part; 33 denotes a demodulation part demodulating a reception signal; 34 denotes a decoding part decoding the thus-demodulated signal; and 35 denotes a control message extraction part which extracts MAP data from the decoded data (received from the BS), gives it to a MAP information generation and analysis part 36, and also, transfers data for the MS from the BS to a packet buffer part 38. Also the same in a case of receiving a radio signal from the MS, reception data is transferred to the packet buffer part 38 for being transmitted to the BS. Further, the control message extraction part 35 extracts a control message (RNG-REQ, RNG-RSP, or such) from the received message, and gives it to a ranging control part 39.

37 denotes a code reception part which, when receiving a ranging code from the MS (initial ranging, handover ranging or such), determines whether or not correction is required for the frequency, reception power level and timing of the reception signal, and notifies the ranging control part 39 of the status (success/abort/continue), as well as information concerning the received code, for example, code reception information such as the frame number, sub-channel, code value and so forth of the reception of the code, together with the correction values.

39, 40 denote the ranging control part and a control message generation part included in the control part controlling the respective parts of the RS 200, respectively.

The control part is connected to a storage part. In the storage part, various sorts of data which the RS 200 should store are stored. For example, the code reception information, correction information and so forth are stored.

When receiving information from the code reception part 37, and when the status is "success", the ranging control part 39 notifies the control message generation part 40 to generate an RNG-REQ including a "New MS" indicator, and transmit it to the BS with the basic CID of the RS. On one hand, when the status is "continue", it is notified to the control message generation part 40 to generate an RNG-RSP message including the correction information and information concerning the code, and transmit it to the MS with the CID for initial ranging.

Further, when the RNG-REQ message is received from the control message extraction part 35, the ranging control part 39 determines whether or not the CID included in the header of the message is the CID for initial ranging. When it is the CID for IR, it is notified to the control message generation part 40 to change the CID field of the header of the received RNG-RSP message into the basic CID of the RS 200, and transmit it to BS. On one hand, when it is not the CID for IR, that is, it is the MS's basic CID, ordinary periodic ranging processing of the MS is then carried out.

Further, when the RNG-RSP message is received from the control message extraction part 35, first it is determined whether or not the CID is the CID for initial ranging. When it is the CID for IR, initial ranging processing of the RS 200 is carried out. That is, when the MAC address included in the RNG-RSP is the own MAC address, the basic CID and the primary CID included in the message are stored, which are then used for subsequent transmission/reception of control messages. On the other hand, when it is other than the CID for IR, processing to carry out differs according to whether or not the message includes a "New MS" indicator. When the "New MS" indicator is included, and also, when a "success" status is included in the message, it is notified to the control message generation part 40 to generate an RNG-RSP message including a "success" status, and return it to the MS with a CID for IR. However, when no "success" status is included, it is notified to the control message generation part 40 to generate an RNG-RSP message including an "abort" status, and return it to the MS with a CID for IR. On one hand, when no "New MS" indicator is included, and when MSID, i.e., the MS MAC address is included in the message, it is notified to the control message generation part 40 to convert the CID field of the header of the received RNG-RSP message into a CID for IR, and return it to the MS.

The control message generation part 40 responds to instructions from the ranging control part 39, to generate the various sorts of control messages, and give them to the PDU generation part 41 as transmission data. Further, for the purpose of ensuring transmission regions, a request is made to the MAP information generation and analysis part 36 for ensuring the transmission regions. At this time, information required for creating MAP data (a connection ID and so forth) is also given to the MAP information generation and analysis part 36.

The MAP information generation and analysis part 36 uses a broadcast CID transferred from the control message extraction part 35, to control downlink and uplink communication (MMR link) with the BS, according to DL-MAP and UL-MAP obtained from the BS, and also, to generate DL-MAP and UL-MAP according to scheduling which is carried by itself, and transmit them to the MS with the broadcast CID. In a frame by which the RS 200 transmits the MAP data and corresponding data, a preamble is included the same as in the BS 300. This is because synchronization should be established in the MS.

38 denotes the packet buffer part. Therewith, according to the MAP data generated by the MAP information generation and analysis part 36, packet data is transferred to the PDU generation part 41 for radio communication.

41 denotes the PDU generation part, which obtains the MAP data generated by the MAP information generation and analysis part 36 and data to be transmitted in the region defined by the MAP data from the packet buffer part 38 and the control message generation part 40, and gives them to an encoding part 41 as the entire transmission data.

42 denotes the encoding part, and 43 denotes a modulation part. The transmission data given by the PDU generation part 41 is encoded by the encoding part 42, and modulation processing is carried out by the modulation part 43 such that, user data is transmitted in transmission timing and channel generated by the MAP information generation and analysis part 36. After that, the thus-obtained data is given to a transmission part 44.

44 denotes the transmission part which transmits the given data as a radio signal to the MS or the BS.

[b] Description of Second Embodiment:

In the first embodiment described above, the RS 200 itself generates the MAP data, and transmits it to the MS 100. However, in a second embodiment of the present invention, which will now be described, the BS 300 generates the MAP data which the RS 200 transmits to the MS 100, and transmits it via the MMR link. Thus, the RS 200 transmits the MAP data, having been received from the BS 300, as MAP data which the RS 200 itself is to transmit.

Thereby, the RS 200 can leave scheduling processing in the charge of the BS 300, and thus, a processing load of the RS 200 can be reduced, whereby the apparatus of the RS 200 can be miniaturized.

Figure 9:
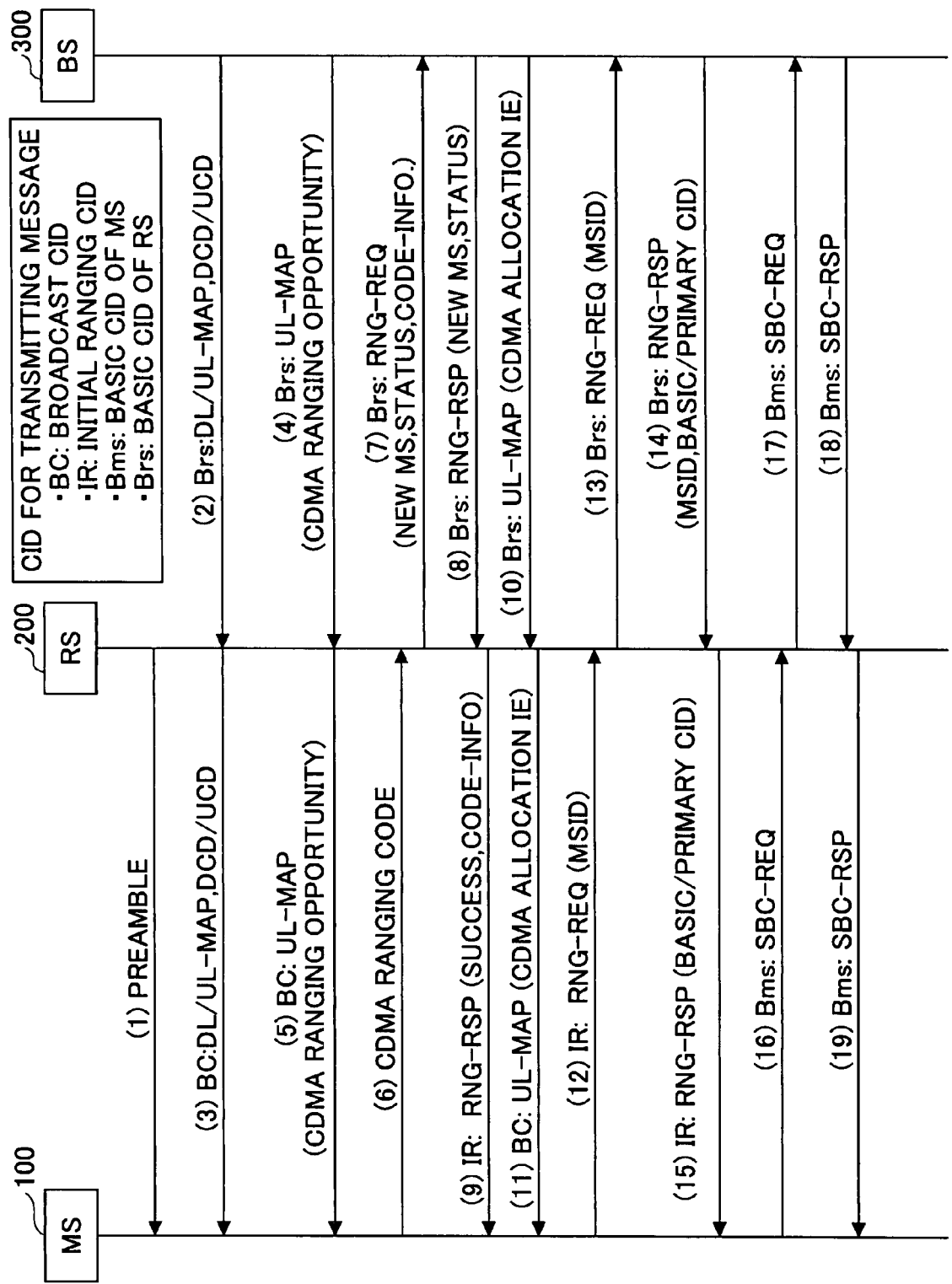
FIG. 9 shows another example of the ranging and basic capability registration sequence.

FIG. 9 shows a ranging and basic capability registration sequence for the MS 100 to start connection with the RS 200.

In comparison with FIG. 1, it is seen that, the MAP data (3), (5) and (11), corresponding to the messages (2), (3) and (8) of FIG. 1, are transmitted based on the MAP data (2), (4) and (10) (received in the data regions) given via the MMR link from the BS 300 to the RS 200.

That is, in FIG. 9, a message of (2) is transmitted as (3), a message of (4) is transmitted as (5) and a message of (10) is transmitted as (11). The other messages correspond to those described above for FIG. 1, and the same processing is carried out therefor.

The operation will be briefly described.

The MS 100 first receives a preamble signal from the RS 200 (1), and establishes synchronization. It is noted that, at this time, the MS 100 does not distinguish between the RS 200 and the BS 300, and thus, recognizes the RS 200 as the BS 300.

The BS 300 generates MAP information such as DL-MAP and UL-MAP which the RS 200 transmits to the MS 100, and the BS 300 transmits it to the RS 200 with the use of the basic CID of the RS 200, via the MMR link, through transmission with the data region (2).

The RS 200 which has received the MAP information then uses a broadcast CID to transmit the received MAP information to the MS 100 as DL-MAP and UL-MAP data (3). It is noted that, the contents of (2) and (3) are basically identical. However, the connection ID is changed. Further, while the message (2) is transmitted via the MMR link with the data transmission region (i.e., the transmission region defined by the MAP region), the message (3) is transmitted in the MAP data transmission region which the RS 200 carries out transmission. Also, messages (4) and (10) described below, have the same relationship.

After receiving messages such as the DL-MAP, UL-MAP, DCD, UCD and so forth, thus receiving the necessary information, and then receiving the UL-MAP defining a ranging region (5), the MS 100 uses the ranging region designated by the MAP to transmit a ranging CDMA code to the RS 200 (6). Also at this time, the UL-MAP, having been generated by the BS 300, is then transmitted and relayed by the RS 200.

The RS 200 having received the code, then transmits an RNG-REQ message to the BS 300 (7), which message includes information indicating that the MS 100 exists which requests connection (i.e., a "New MS" indicator), reception information concerning the CDMA code, for example, a frame number and a sub-channel of the reception of the code, a code value, a status and so forth, and also, correction values for when the transmission parameters of the MS 100 should be corrected.

At this time, a "success" status is given when errors in the frequency, reception power level and timing lie within predetermined values, while a "continue" status is given when the errors exceed the predetermined values. Further, the RNG-REQ message is transmitted with the use of the basic CID allocated to the RS 200 by the BS 300. Accordingly, the BS 300 can determine which RS has received the connection request, from the CID of the message. It is noted that, in this sequence, the CDMA code for initial ranging is assumed.

However, the same operation is also carried out in a case where a CDMA code for HO ranging which is used when the MS 100 carries out handover from another BS is received.

The BS 300 having received the RNG-REQ refers to storage data of the storage part for vacant resources of its own or vacant resources of the RS 200, and therefrom, determines whether or not the new MS 100 can be accepted. Then the determination result is returned to the RS 200 by means of an RNG-RSP message (8). In this message, when the new MS 100 is acceptable, in addition to the "New MS" indicator, the "continue" status, the CDMA code reception information and the correction information are included when the status in the RNG-REQ message received form the RS 200 is the "continue" status. On the other hand, the "success" status and the CDMA code reception information are included when the status in the RNG-REQ message received from the RS 200 is the "success" status. The RNG-RSP message is then transmitted to the RS 200 with the use of the basic CID of the RS 200. On one hand, when the new MS 100 cannot be accepted, an RNG-RSP message including an "abort" status and the CDMA code reception information is generated and transmitted to the RS 200 with the use of the basic CID of the RS 200.

The RS 200 which has received the RNG-RSP from the BS 300 generates an RNG-RSP in which, the "New MS" indicator is removed when the received message includes the "New MS" indicator, and transmits the generated message to the MS 100 with the use of a CID for initial ranging (9).

When transmitting the RNG-RSP of the "success" status to the RS 200, the BS 300 generates UL-MAP including CDMA_Allocation-IE to allocate a band for the MS 100, to transmit an RNG-REQ message by means of the MAP information generation part 21, and transmits it to the RS 200 with the use of the basic CID of the RS 200 via the MMR link (10).

The RS 200 which has received the UL-MAP including the CDMA_Allocation-IE transmits the message to the MS 100 with the use of a broadcast CID (11).

The MS 100 having received the RNG-RSP adjusts the frequency, reception power level and timing according to the correction information included in the RNG-RSP, when the status is "continue", and again transmits a ranging CDMA code to the RS 200 (not shown). When the status is "success", the MS 100 refers to the CDMA_Allocation-IE included in the UL-MAP massage, and transmits an RNG-REQ message to the RS 200, which includes the MAC address of the MS 100 (MSID) (12).

The RS 200 having received the RNG-REQ from the MS 100 replaces the CID for IR included in the header of the message transmitted by the MS 100 with the basic CID of the RS 200, and transfers it to the BS 300 (13).

When receiving the RNG-REQ message transferred from the MS 100, the BS 300 identifies the RS 200 which has transmitted the message, from the CID (the basic CID of the RS 200) included in the header of the message, and registers it with association to the MAC address of the MS 100 included in the payload part and the RS 200. Thereby, it is possible to manage as to which RS the MS 100 identified from the MAC address belongs to. Then, the BS 300 generates an RNG-RSP including the basic CID and the primary CID which are the control connection for the MS 100 which has transmitted the RNG-REQ message, and returns it to the RS 200 (14).

The RS 200 having received the RNG-RSP including the basic CID and the primary CID for the MS 100, from the BS 300, changes the CID in the header of this message into a CID for initial ranging, and transfers it to the MS 100 (15).

The MS 100 having received the RNG-RSP including the basic CID and the primary CID transmits an SBC-REQ message to the RS 200 for notifying of a capability of the MS 100 itself (16).

The RS 200 having received the SBC-REQ message from the MS 100 transfers it to the BS 300 (17).

The BS 300 having received the SBC-REQ message from the RS 200 generates an SBC-RSP massage notifying the MS 100 of a function which each of the MS 100, the RS 200 and the BS 300 can support, from among the support functions of the capability having been notified of from the MS 100, and transmits it to the RS 200 (18). At this time, in order that the RS 200 can recognize what has the support function included in the SBC-RSP, the basic CID of the MS 100 included in the header of the SBC-REQ message is used as it is, and the BS 300 transmits the SBC-RSP to the RS 200. As another method, the basic CID of the RS 200 may be used in the header, and, in the payload, an identifier indicating the MS 100, for example, the MAC address or the basic CID of the MS 100, may be included. Thereby, the RS 200 can determine which MS has the support function.

It is noted that, in a process in which the RS 200 relays the messages between the MS 100 and the BS 300, the information included in the messages may be obtained by the RS 200. For example, the MAC address, the basic CID, the primary CID of the MS 100, and also, the support functions notified of by the SBC-REQ/RSP messages, can be managed not only by the BS 300 but also by the RS 200.

The RS 200 which has received the SBC-RSP message transfers it to the MS 100 as it is (19).

FIGS. 10 through 13 show a processing flow of the RS 200 when receiving the ranging code from the MS 100, a processing flow of the RS 200 when receiving the RNG-REQ from the MS 100, a processing flow of the RS 200 when receiving the RNG-RSP from the BS 300 and a processing flow of the BS 300 when receiving the RNG-REQ, respectively.

Further, a block configuration example of the BS 300 in the second embodiment of the present invention is the same as that of the BS 300 in the first embodiment described above.

Figure 13:
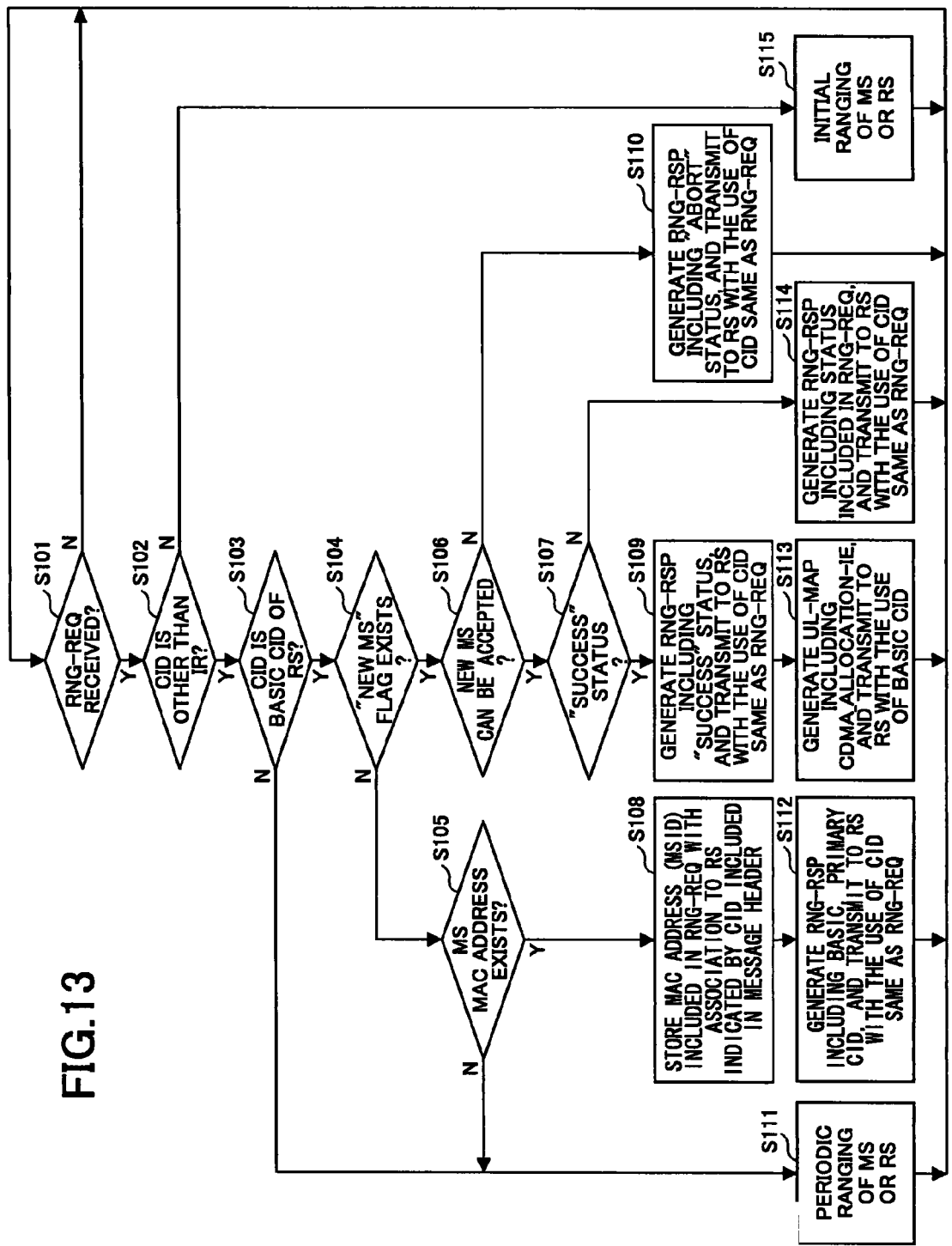
FIG. 13 shows a processing flow of the BS when receiving a ranging request.

With reference to the block configuration of the BS 300 shown in FIG. 6, as well as the processing flow of FIG. 13, the operation of the BS 300 will now be described.

After receiving a message (Yes in S101 of FIG. 13), the BS 300 extracts a control message (RNG-REQ) from the received message, and gives it to the ranging control part 26.

The ranging control part 26 analyzes the RNG-REQ message, analyzes the CID included in the header of the message, carries out control described below, and requests the control message generation part 25 to generate and transmit an RNG-RSP message.

When the CID is a CID for initial ranging (IR) (No in S102), this means that the message corresponds to a ranging request message from the MS 100 or the RS 200 belonging to the BS 300, and thus, it is notified to the control message generation part 25 to generate the RNG-RSP message including the MAC address included in the RNG-REQ, the "success" status, the basic CID and the primary CID when correction of the frequency, transmission power and timing of the MS 100 is not necessary, and transmit it with CID=IR (S115). When the correction is necessary, it is notified to the control message generation part 25 to generate the RNG-RSP message including the MAC address included in the RNG-REQ, the "continue" status, and the necessary correction information, and transmit it with CID=IR (S115).

When the CID is not for IR but is the basic CID of the MS 100 (Yes in S102 and No in S103), periodic ranging of the MS 100 is carried out (S111). The same as the above-mentioned case for IR, it is notified to the control message generation part 25 to generate the RNG-RSP including the contents depending on whether or not the correction is necessary, and transmit it with the use of the basic CID of the RNG-REQ.

When the CID is not for IR but is the basic CID of the RS 200 (Yes in S103), processing to carry out differs according to whether or not a "New MS" indicator is included in the payload part of the RNG-REQ message.

When the "New MS" indicator is not included (No in S104), processing to carry out differs according to whether or not the MS MAC address (MSID) exists. When the MS MAC address does not exist (No in S105), periodic ranging of the RS 200 is carried out (S111). When the MS MAC address exists (Yes on S105), the received RNG-REQ message means a message relayed by the RS 200 after being transmitted from the MS 100. At this time, the MS MAC address in the RNG-REQ message and the basic CID included in the header of the RNG-REQ message are managed with association to one another (S108), and thus, the RS 200 currently connected from the MS 100 can be identified. Next, it is notified to the control message generation part 25 to generate the RNG-RSP message including the basic CID and the primary CID to allocate to the MS 100, and transmit it with the use of the CID of the basic CID of the RS 200 (S112). The association between the MS 100 and the RS 200, as well as the basic CID and the primary CID of the MS 100, are managed by an MS management table stored in the storage part.

When the "New MS" indicator exists (Yes in S104), it is determined whether or not the new MS 100 is acceptable (S106). This determination can be made from busy conditions of the respective resources, such as busy conditions of the radio resources, a busy condition in the management table and so forth. When the new MS 100 is acceptable (Yes in S106), it is notified to the control message generation part 25 to generate the RNG-RSP message including a "success" status and UL-MAP including CDMA_Allocation-IE, and transmit it with the use of the basic CID of the RS 200, when the status in the RNG-REQ is "success" (Yes in S107, then, S109 and S113). When the status included in the RNG-REQ is not "success" (No in S107), it is notified to the control message generation part 25 to generate the RNG-RSP message including the status from the RNG-REQ, and correction values for the transmission parameters, and transmit it with the use of the basic CID of the RS 200 (S114). The CDMA_Allocation-IE is created based on information concerning the code notified of by the RNG-REQ. On one hand, when the new MS 100 is not acceptable (No in S106), it is notified to the control message generation part 25 to generate the RNG-RSP message including an "abort" status, and transmit it with the use of the CID, the same as that of the RNG-REQ, to the RS 200 (S110).

Figure 11:
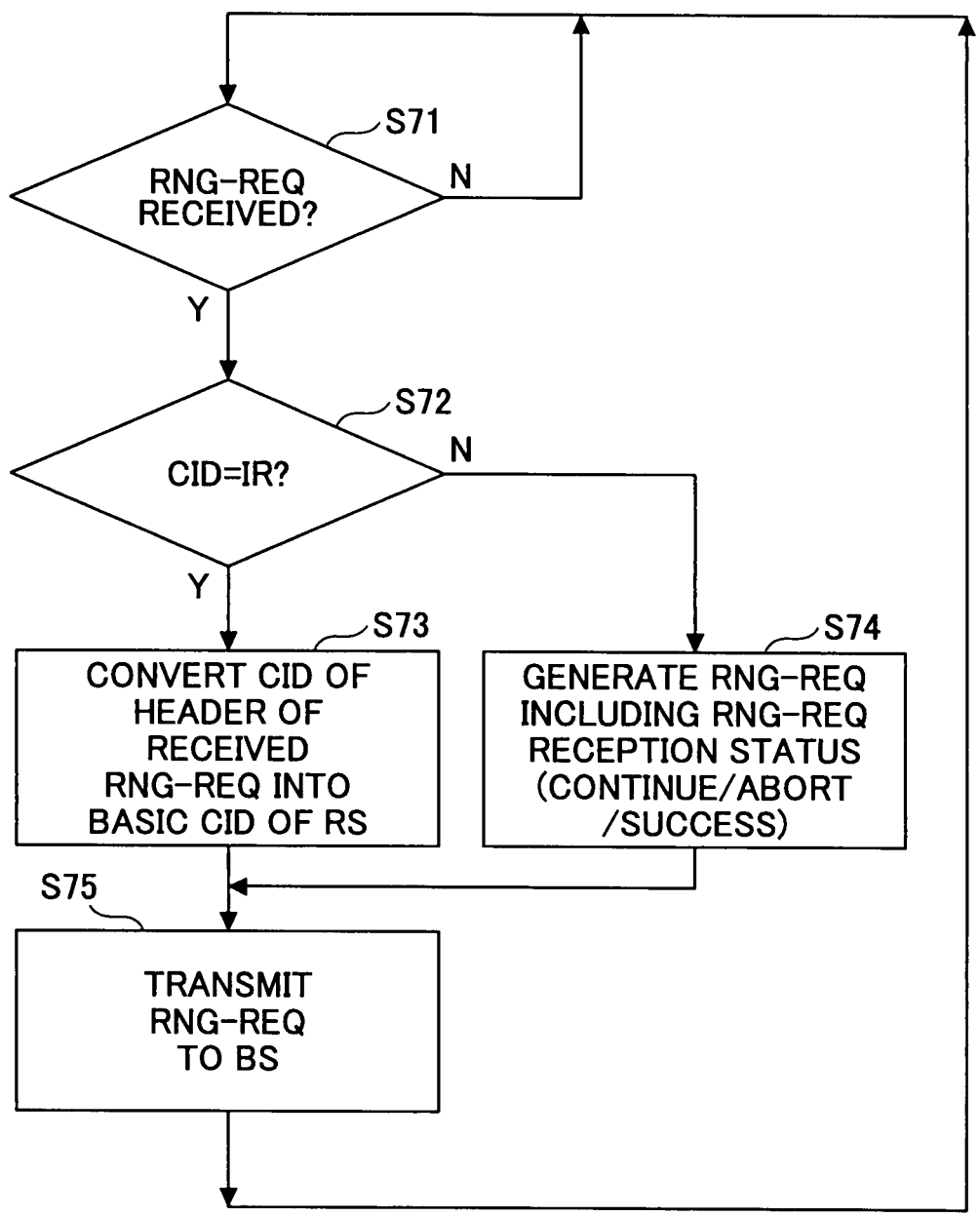
FIG. 11 shows a processing flow of the RS when receiving a ranging request from the MS.
Figure 12:
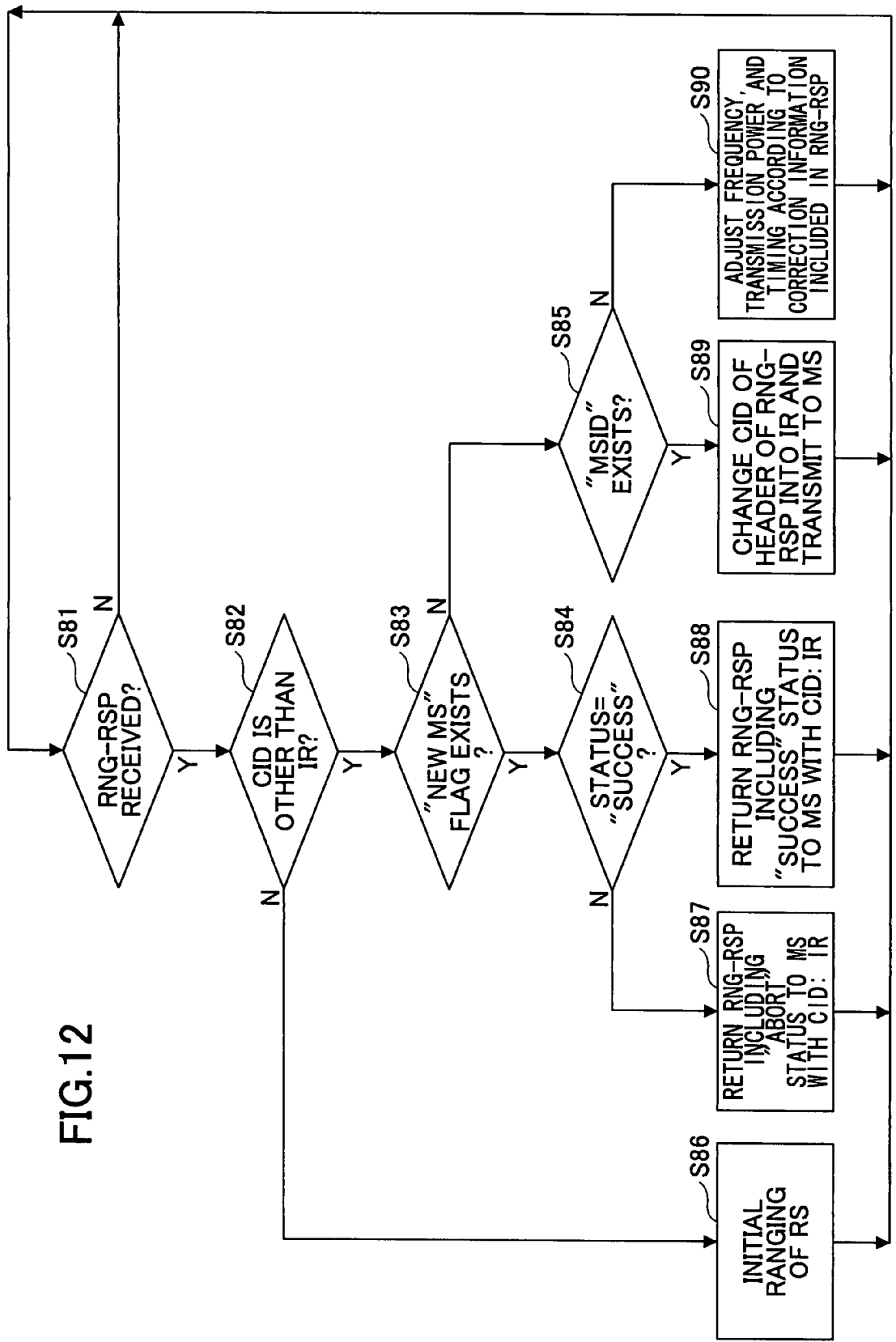
FIG. 12 shows a processing flow of the RS when receiving a ranging response from the BS.
Figure 14:
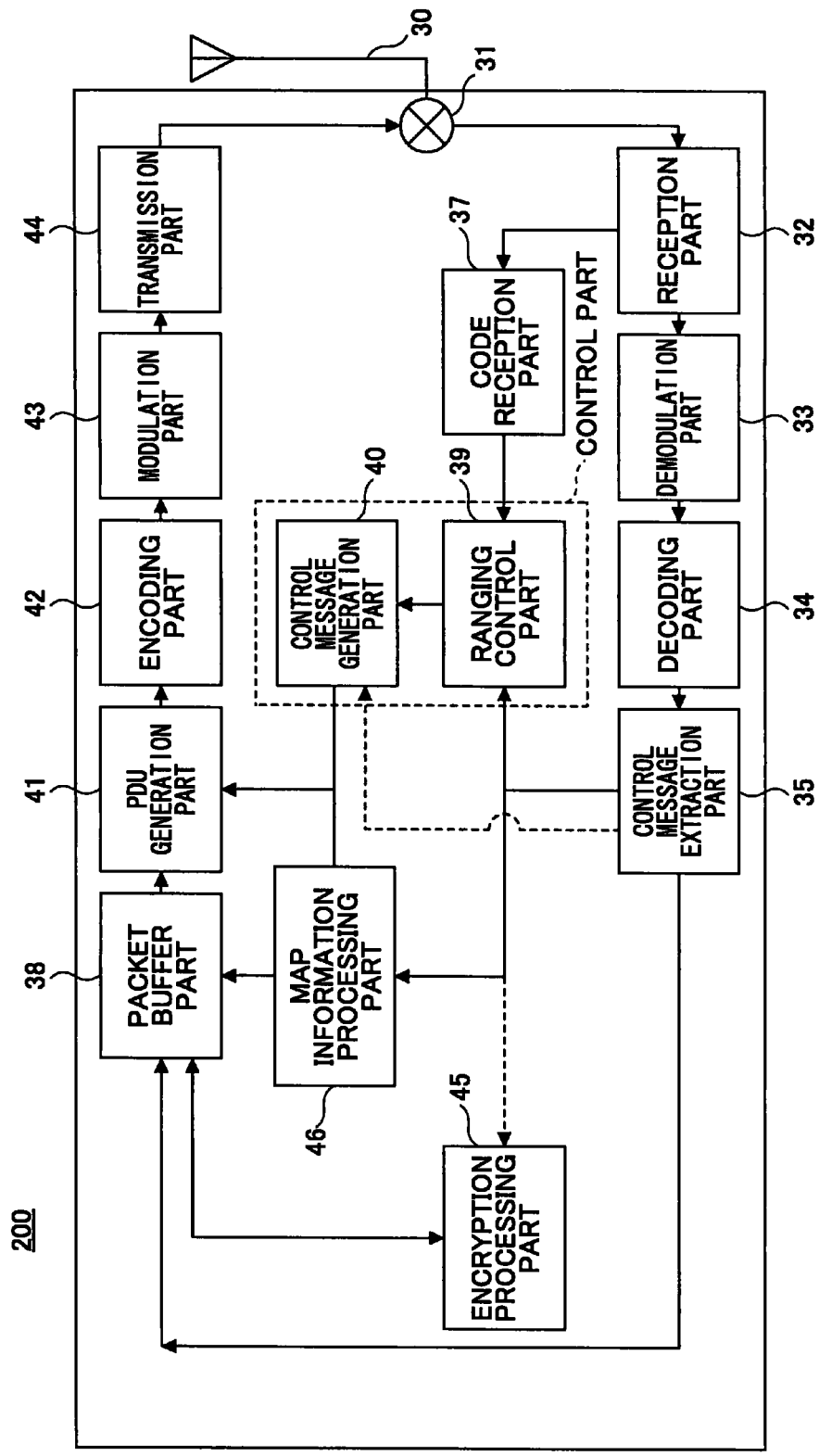
FIG. 14 shows another block configuration example of the RS.

With reference to FIG. 14 showing a block configuration of the RS 200, as well as the processing flows of FIGS. 10, 11 and 12, the operation of the RS 200 will now be described.

The block configuration of FIG. 14 is basically the same as that of FIG. 8. However, since the generation of the MAP information is not necessary, a MAP information processing part 46 is provided, instead of the MAP information generation and analysis part 36 of FIG. 8. The other parts are the same as those of FIG. 8, and the duplicated description is omitted.

When the ranging code (for initial ranging, handover ranging or such) is received from the MS 100 (Yes in S61 of FIG. 10), the code reception part 37 determines whether or not correction of the frequency of the reception signal, reception power level and timing is required, and notifies the ranging control part 39 of its status (success/abort/continue), code reception information, for example, a frame number, subchannel, code value of the received code and so forth. When the correction is necessary, the correction values to be directed to the MS 100 are also given to the ranging control part 39. Also, the correction values may be stored in the storage part.

The control message extraction part 35 extracts the control message (RNG-REQ, RNG-RSP or such) from the received message, gives it to the ranging control part 39, and gives the MAP data received from the BS 300, and the MAP data received via the data region of the MMR link to be transmitted to the MS 100, to the MAP information processing part 46.

Figure 10:
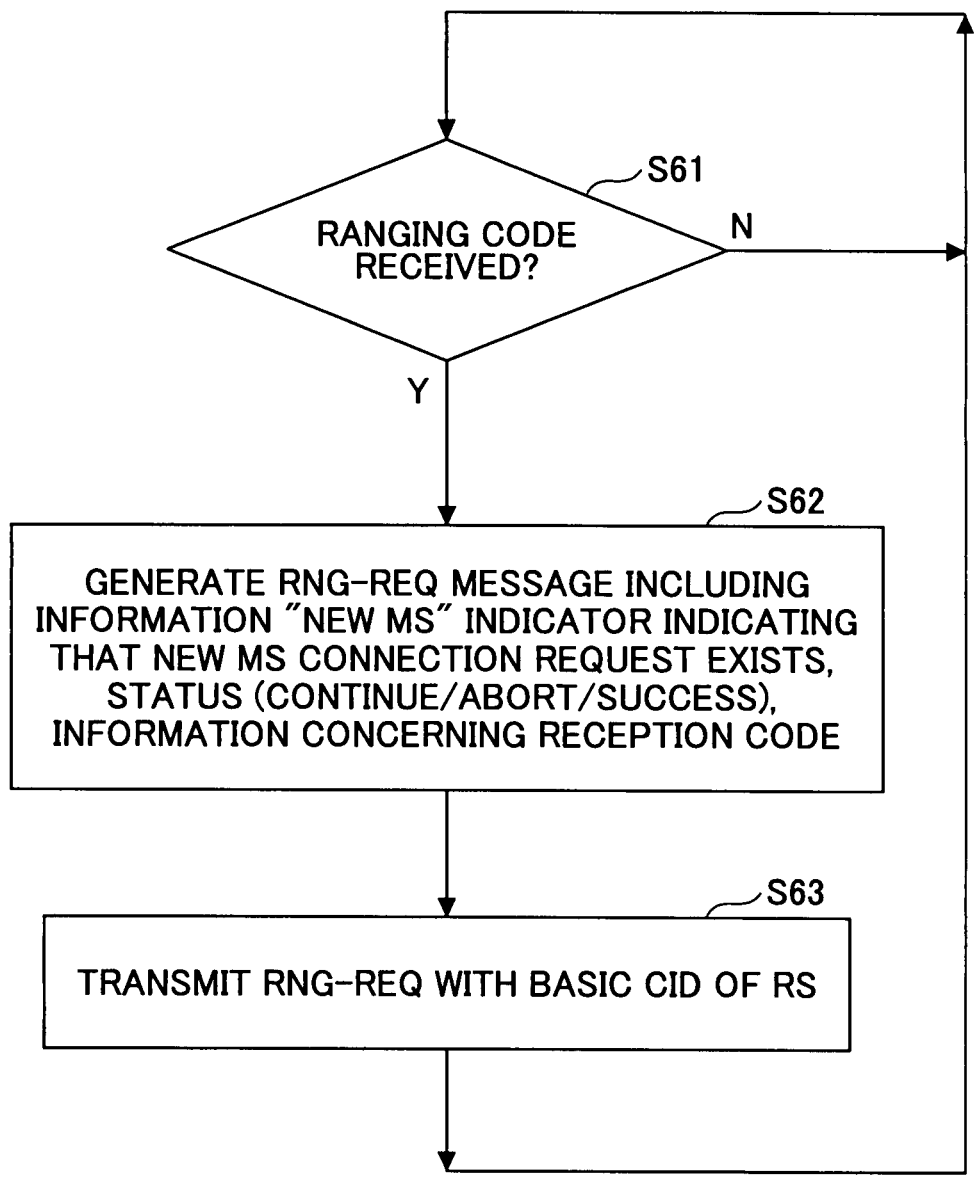
FIG. 10 shows a processing flow of the RS when receiving a ranging code from the MS.

When receiving information from the code reception part 37, the ranging control part 39 notifies the control message generating part 40 to generate and transmit the "New MS" indicator and the status (success/abort/continue) to the BS 300 with the basic CID of the RS 200 (S62, S63 of FIG. 10). When the status is "continue", the correction values are also notified of to the control message generation part 40.

When receiving the RNG-REQ message from the control message extraction part 35 (Yes in S71 of FIG. 11), the ranging control part 39 determines whether or not the header of the message has a CID for initial ranging (S72). When it is the CID for IR (Yes), it is notified to the control message generation part 40 to transmit the message to the BS 300 after changing the CID field in the header of the received RNG-REQ message into the basic CID of the RS 200 (S73, S75 of FIG. 11). When the CID is not the CID for IR (No in S72), that is, when the CID is the basic CID of the MS 100, it is notified to the control message generation part 40 to add to the received RNG-REQ message the status and, if necessary, the correction information for the frequency, reception power level and timing, and transmit it to the BS 300 with the basic CID of the MS 100 (S74 and S75).

When receiving the RNG-RSP message from the control message extraction part 35 (Yes in S81 of FIG. 12), the ranging control part 39 first determines whether or not the CID is the CID for initial ranging (S82). When it is the CID for IR (No), the ranging control part 39 carries out initial ranging processing of the RS 200 (S86). That is, when the MAC address included in the RNG-RSP is the MAC address of itself, the basic CID and the primary CID in the message are stored in the storage part, and are used for transmission/reception of subsequent control messages. On one hand, when a CID other than the CID for IR is included in the message (Yes in S82), processing to then carry out differs according to whether or not the "New MS" indicator is included in the message (S83). When the "New MS" indicator is included (Yes), it is notified to the control message generation part 40 to generate an RNG-RSP message including a "success" status and return it to the MS 100 with the CID for IR (S88), when the "success" status is included in the message (Yes in S84). When no "success" status is included in the message (No in S84), it is notified to the control message generation part 40 to generate the RNG-RSP message including the "abort" status and return it to the MS 100 with the CID for IR (S87). On one hand, when no "New MS" indicator is included in the message (No in S83) and, MSID, i.e., the MS MAC address is included in the message (Yes in S85), it is notified to the control message generation part 40 to convert the CID field in the header of the received RNG-REQ into the CID for IR, and transmit it to the MS 100 (S89). When MSID does not exist (No in S85), the RS 200 adjusts the frequency, transmission power and timing according to the correction information included in the RNG-RSP, as the periodic ranging processing of the RS 200 itself (S90).

The MAP information processing part 46 carries out controlling of the PDU generation part 41 for creating the MMR link according to the MAP data of the BS 300 transferred from the control message extraction part 35. Further, it controls the PDU generation part 41 and so forth, for transmitting the MAP data to be transmitted to the MS 100, which has been received from the BS 300 via the MMR link.

In the second embodiment described above, when the RS 200 receives the ranging code from the MS 100, the RS 200 transmits the code reception information to the BS 300. As a result, the BS 300 should not generate the code reception information, and thus, the processing load of the BS 300 is reduced.

Further, in the second embodiment, another MMR link, than the transmission region of the ranging signal, defined by the MAP data transmitted to the RS 200 and so forth, belonging to the BS 300, is used to transmit the code reception information to the BS 300. As a result, collision with the ranging signal of another MS 100, also belonging to the BS 300, can be reduced.

Further, also in this embodiment, the transmission region defined by the MAP data transmitted by the BS 300 and the transmission region defined by the MAP data transmitted by the RS 200 may have such a relationship that they are separated by means of timing, by means of the frequency (sub-channel) or by means of the spread code or such, so that radio communication are not obstructed by one another. For this purpose, the BS 300 should generate appropriate MAP data.

[c] Description of Third Embodiment:

In a third embodiment of the present invention, degradation in the transmission efficiency, otherwise occurring due to a fact that a radio communication environment between the BS and the RS and a radio communication environment between the RS and the MS may not be identical to one another can be controlled.

It is noted that, in this embodiment, one example of an authentication sequence is described, which may be carried out subsequent to the ranging and basic capability registration sequence described above for the first and second embodiments.

Figure 15:
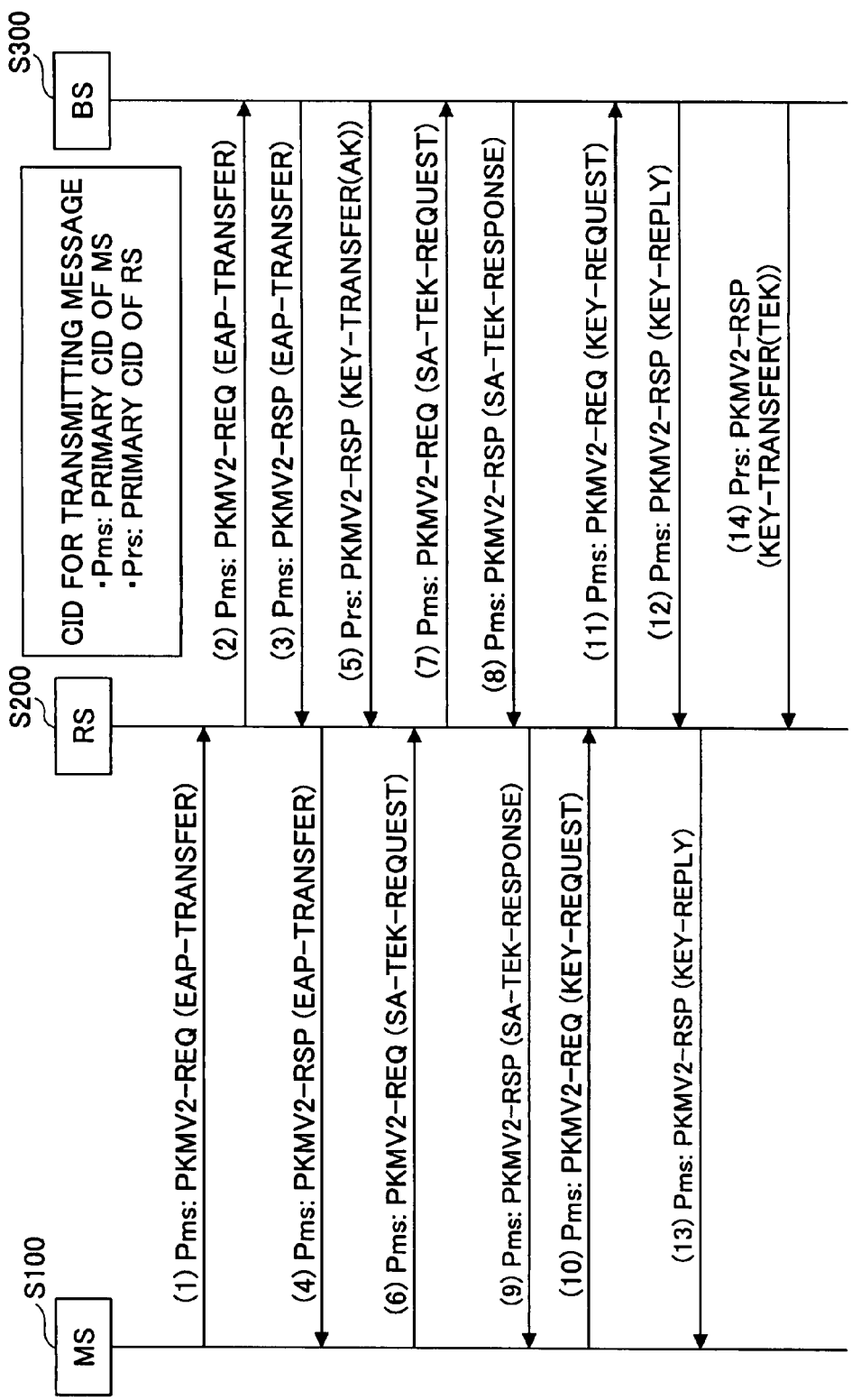
FIG. 15 shows an example of an authentication sequence.

FIG. 15 shows the authentication sequence which should be preferably carried out after the end of the ranging and basic capability registration sequence.

In this embodiment, the MS 100 carries out the authentication sequence after finishing the ranging and basic capability registration sequence.

First, the MS 100 transmits its own authentication data (for example, an electronic certificate including the MS's public key) to the RS 200 with the use of a PKMv2-REQ message (1). In FIG. 15, an example is shown in which, in the PKMv2-REQ message, an EAP (Extensible Authentication Protocol: RFC2284) packet is encapsulated. It is noted that, at this time, the primary CID obtained previously is used as the connection ID. Thereby, both of the RS 200 and the BS 300 can easily identify the MS 100.

The RS 200 which has thus-received the PKMv2-REQ (EAP-transfer) relays the message to the BS 300 (2). There, it is not necessary to decrypt cipher at the RS.

The BS 300 which has thus received the PKMv2-REQ (EAP-transfer) transfers the electronic certificate to an external server to obtain an authentication result, and thus, carries out authentication. When the authentication is succeeded in, an authentication key (AK) to be shared by the MS 100 and the BS 300 is then generated, and also, to the MS 100, a PKMv2-RSP (EAP-transfer) including the authentication key (AK or a parameter for generating AK) is generated, which is then returned to the RS 200 (3). At this time, preferably, the AK or the parameter for generating the AK is encrypted with the use of the public key included in the electronic certificate of the MS 100. Thereby, only the MS 100 itself, which has the corresponding private key, can decrypt, and thus, it is possible to achieve safe transfer of the authentication key information.

The RS 200 which has thus received the PKMv2-RSP (EAP-transfer) relays the message to the MS 100 (4). At this time, the RS 200 does not have the private key, and thus, cannot decrypt the encrypted authentication key information.

On one hand, the BS 300 transmits a PKMv2-RSP (key-transfer (AK)) including data obtained from encrypting the authentication key information (AK or the parameter for generating AK), to the RS 200, in order that the authentication key used with the MS 100 is also shared with the RS 200 (5). In the encryption, it is preferable to use the key, shared when the RS 200 has carried out the authentication to connect with the BS 300. The RS 200 stores the authentication key information.

The MS 100 which has thus received the PKMv2-RSP (EAP-transfer) detects that the authentication has been succeeded in. In order to establish security association (i.e., an encryption method and so forth) with the BS 300, the MS 100 transmits a PKMv2-REQ (SA-TEK-request) (6). In this message, a calculation result (a hash value, for example) obtained from predetermined calculation (hash calculation or such, for example) being carried out on the AK, obtained from the authentication key information, previously obtained the MS 100, and the transmission data, is added. For example, a parameter generated from the AK is one argument of a function F(x), and, a calculation result F(D) is obtained as a result of the transmission data D being substituted for x. Further, in this message, encryption methods (for example, AES, DES, key length information and so forth) to require, are included.

The RS 200 which has thus received the PKMv2-REQ (SA-TE-request) relays the message to the BS 300.

The BS 300 which has thus received the PKMv2-REQ (SA-TE-request) decrypts the cipher, the same as in the previous case, refers to the encryption methods required by the MS 100, selects a encryption method which can be adopted, determines SA configured by the encryption method (for example, key length information) used between the BS 300 and the MS 100, and returns the SA information to the RS 200 by means of a PKMv2-RSP (SA-TEK-response) (8). It is noted that, the BS 300 checks as to whether or not the calculation result (hash value) included in the message agrees with a calculation result obtained from predetermined calculation (for example, hash calculation) with the use of the authentication key (AK or the parameter obtained from AK) which the BS 300 itself has (stores) and the reception data. Thereby, the BS 300 determines whether or not the message is one from the MS 100 which has been authenticated and thus is authentic. When it is not authentic, the processing should be rejected.

The RS 200 which has thus received the PKMv2-RSP (SA-TEK-response) relays the message to the MS 100 (9).

The MS 100 which has thus received the PKMv2-RSP (SA-TEK-response) and thus shares the SA with the BS 300, transmits a PKMv2-RSP (key-request) requesting from the BS 300 an encryption key for encrypting user data, corresponding to the SA, to the RS 200 (10). At this time, the same as (6), the calculation result is added for the purpose of authentication.

The RS 200 which has thus received the PKMv2-REQ (key-request) relays the message to the BS 300 (11).

The BS 300 which has thus received the PKMv2-REQ (key-request) generates an encryption key corresponding to the SA (TEK: Traffic Encryption Key), encrypts it with the use of the shared key shared with the MS 100, includes it in a PKMv2-RSP (key-replay), and transmits the message to RS 200 (12). Also at this time, the BS 300 uses the calculation result added in the reception message, for the purpose of authentication to check as to whether or not the data is one from the MS 100 which is authentic. Then, when it is authentic, the PKMv2-RSP is transmitted to the RS 200.

The RS 200 which has thus received the PKMv2-RSP (key-reply) relays the message to the MS 100 (13).

On one hand, the BS 300 shares the key information (instead of the data of the key itself, information for identifying the key, a parameter for generating the key or such, may be used) with the RS 200. That is, the key information (in this example, TEK, i.e., the key itself) is encrypted, and a PKMv2-RSP (key-transfer (TEK)) including TEK, i.e., the thus-encrypted key, is transmitted to the RS 200. In the encryption of the key, the key shared upon the authentication for the purpose that the RS 200 has connected with the BS 300, is used.

In this case, TEK is used as the shared key. However, this may also be used as another key (private key or such).

Thus, the RS 200 can obtain AK and TEK required for the data, transmitted/received between the BS 300 and the MS 100.

As a result, the RS 200 can decrypt user data (MAC-PDU) received from the MS 100 or the BS 300, and further, TEK is used for decrypting the cipher, so that the RS 200 can obtain the transmission data before being encrypted.

Further, the RS 200 can adjust the data amount by modifying (dividing, combining with other data or such) the transmission data before being encrypted (plain language), which is obtained from decryption of the encryption.

For example, when the available transmission speed of data via radio between the RS 200 and the MS 100 is lower than the available transmission speed of data via radio between the BS 300 and the RS 200, the cipher of MAC-PDU is decrypted, and then, the data is divided into a plurality of MAC-PDU. Then, for each of the thus-divided data, MAC-PDU is encrypted with the use of TEK (shared key), and/or, a predetermined calculation result (i.e., an authentication calculation result), obtained from each of the thus-divided data and AK, is added, for example. After that, the data is transmitted one by one (each divided data being transmitted with a respective one of different frames). As a result, it is possible to control degradation in the transmission efficiency, otherwise occurring due to the difference in the radio environment. It is noted that, the authentication calculation result may not be added when the user data is transmitted, but may be added only when the control data is transmitted (the same manner may be applied also in the subsequent processing).

On the other hand, when the available transmission speed of data via radio between the RS 200 and the MS 100 is higher than the available transmission speed of data via radio between the BS 300 and the RS 200, MAC-PDU obtained from decryption with the use of TEK is combined together, then the combined result is again encrypted with the use of TEK, and/or, a predetermined calculation result with the use of AK is added thereto, and then, is transmitted within one frame. As a result, it is possible to avoid useless transmission, and to allocate the thus-saved resource to another radio communication.

The reason why the cipher decrypted is again encrypted by the RS 200 is as follows: Since, when receiving MAC-PDU from the RS 200, the MS 100 tries to decrypt it as one unit, and thus, an error may occur when decrypting is tried on incomplete data. Especially when the MS 100 does not distinguish as to whether it carries out radio communication with the RS 200 or the BS 300, a trouble may occur when data modification is thus made by the RS 200. The same situation may occur also when data is combined as mentioned above. Further, as a result of the RS 200 checking, with the use of AK, authenticity of the authentication calculation result added to the control message transmitted from the MS 100 or the BS 300, it is possible to prevent transfer of non-authentic packet, and thus, it is possible to effectively use the radio resources.

A configuration of a relay station in the third embodiment is shown in FIG. 8.

The above-mentioned message received from the MS 100 or the BS 300 is given to the control message generation part 40 after being extracted by the control message extraction part 35.

The message transmitted to the MS 100 or the BS 300 is generated and transmitted in such a manner that the control message generation part 40 generates a transmission control message based on the received control message which is then given to the PDU generation part 41.

For example, in FIG. 15, the same message may be used between (1) and (2), between (3) and (4), between (6) and (7), between (8) and (9), between (10) and (11) and between (12) and (13). The control message generation part 40 may not encrypt the reception message, may give it as it is to the PDU generation part 41, and thus, may transmit it from the PDU generation part 41.

On one hand, as to the messages of (5) and (14) in FIG. 15, the message is given to the encryption processing part 45 from the control message extraction part 35 since it is one for the RS 200, according to the CID. The encryption processing part 45 decrypts the cipher with the use of the key shared between the RS 200 and the BS 300, thus obtains information such as AK which is the authentication key information (or the parameter for generating AK), TEK which is the encryption key information and so forth, and stores them.

When the dividing or combining of the data is to be carried out as mentioned above, the encryption processing part 45 takes the transmission packet from the packet buffer part 38, decrypts the cipher with the use of TEK, and then carries out the above-mentioned dividing or combining of the data. The thus-modified data is then again encrypted with the use of TEK (i.e., encryption in the same type as that in which the BS 300 carries out the encryption), and the thus-encrypted data is then given to the packet buffer part 38. Thus, the data after being thus modified can be transmitted.

It is noted that, the transmission region is defined by the MAP information generation and analysis part 36, corresponding to the thus-modified data, and the data is thus transmitted.

Further, when the authentication data is required, the encryption processing part 45 carries out the predetermined calculation with the use of AK (or the parameter for AK) which is stored in the same manner, and the transmission data, encrypts the data with the use of TEK, to which data the calculation result has been added, and then, gives it to the packet buffer part 38. It is noted that, the authentication calculation result added by the MS 100 may be deleted at this time.

It is noted that, when the radio communication system adopts an automatic repeat request (ARQ) control system, the BS 300 transmits the data, after adding identification information for each transmission data such as a sequence number or such.

In this case, in the RS 200, as a result of the sequence number encrypted being decrypted, automatic repeat request control can be carried out separately between the RS 200 and the MS 100.

That is, when it is detected by the decoding part 34 that data transmission is properly carried out from the BS 300 to the RS 200 (i.e., it is detected that the reception is carried out properly from a determination with the use of a CRC check bit added to the data), the encryption processing part 45 decrypts the cipher, and stores the reception data in the packet buffer 38.

Then, when transmitting to the MS 100, the encryption processing part 45 of the RS 200 stores, to the data to which the dividing or combining has been carried out as mentioned above, the sequence number separately in the same format, an then, encrypts it, and returns it to the packet buffer part 38. Then, the data is transmitted to the MS 100 from the transmission part 44. Thereby, the automatic repeat request control can be carried out between the RS 200 and the MS 100. It is noted that, the sequence number added by the BS 300 is deleted. It is noted that, the data to which the sequence number has been added, i.e., which is the data before being encrypted, is stored in the encryption processing part 45.

That is, when the data received from the RS 200 has an error, the MS 100 identifies the data with the use of the sequence number which the RS 200 has added, and makes a repeat request to the RS 200. The RS 200 receives the repeat request identifying the sequence number from the MS 100 by the control message extraction part 35, which then notifies the encryption processing part 45 of the corresponding sequence number. The encryption processing part 45 reads from the storage part the data having the sequence number thus notified of, encrypts it with the use of TEK, and gives the encrypted result to the packet buffer part 38. Thus, data transmission in response to the repeat request to the MS 100 is thus carried out.

Further, when the RS 200 detects that the reception data from the BS 300 has an error, the encryption processing part 45 identifies the data from the sequence number added by the BS 300, which is obtained from decryption, generates a message to notify the BS 300 of the sequence number, and gives it to the packet buffer part 38. Thus, transmission of the message to the BS 300 is carried out. Thus, it is possible to send a repeat request to the BS 300 for the desired data.

The present invention is not limited to the above-described embodiments, and variations and modifications may be made without departing from the basic concept of the present invention claimed below.

The present application is based on Japanese Priority Application No. 2006-301214, filed on Nov. 7, 2006, the entire contents of which are hereby incorporated herein by reference.

What is claimed is:

1. A relay station comprising:
   a reception unit that receives a signal sequence indicating a connection request from a radio terminal, the signal sequence being selected by the radio terminal from among a group of predetermined signal sequences shared by a plurality of radio terminals;
   a control unit that generates a message upon receiving the signal sequence, the message indicating that a radio terminal newly requesting connection exists; and
   a transmission unit that transmits the message to a radio base station,
   wherein the reception unit is configured to measure, when the signal sequence is received, deviations of transmission parameters of the radio terminal in the received signal sequence from standard transmission parameters, and the control unit is configured to generate the message when the measured deviations of the transmission parameters are within predetermined ranges.

2. The relay station as claimed in claim 1, wherein:
the reception unit receives a first message including an identifier of the radio terminal, from the radio terminal;
the control unit generates in response to the reception of the first message a second message including the identifier of the radio terminal and an identifier of the relay station; and
the transmission unit transmits the second message to a radio base station.

3. The relay station as claimed in claim 2, wherein:
the identifier of the radio terminal included in the second message is stored in a payload or a header.

4. The relay station as claimed in claim 1, wherein:
the reception unit receives a message transmitted from a radio base station;
the relay station further comprises a processing unit that modifies data obtained from decrypting encrypted data transmitted between a radio terminal and the radio base station with key information included in the message; and
the transmission unit transmits the thus-modified data.

5. The relay station as claimed claim 4, wherein:
the key information includes shared key information, and the data transmitted by the transmission unit includes data obtained from encrypting with the use of the shared key information after the modification.

6. The relay station as claimed in claim 1, wherein:
the reception unit receives a message transmitted from a radio base station;
the relay station further comprises a processing unit that modifies data to which authentication data is added, transmitted between a radio terminal and a radio base station, and adds the authentication data to the thus-modified data with the use of authentication key information included in the message; and
the transmission unit transmits the data to which the authentication data is added by the processing part.

7. A radio base station comprising:
a reception unit that receives a message, transmitted from a relay station in response to reception of a signal sequence indicating a connection request from a radio terminal, the signal sequence being selected by the radio terminal from among a group of predetermined signal sequences shared by a plurality of radio terminals;
a control unit that determines in response to the reception of the message whether to newly permit connection with the radio terminal, and generates a response message including the determination result; and
a transmission unit that transmits the response message to the relay station,
wherein the relay station is configured to measure, when the signal sequence is received, deviations of transmission parameters of the radio terminal in the received signal sequence from standard transmission parameters, and configured to transmit the message to the radio base station when the measured deviations of the transmission parameters are within predetermined ranges.

8. The radio base station as claimed in claim 7, wherein:
the control unit generates key information used for communication between a radio terminal and the radio base station; and
the transmission unit transmits the key information to the radio terminal and a relay station.

9. The radio base station as claimed in claim 8, wherein:
the key information includes a shared key or an authentication key.

10. The radio base station as claimed in claim 8, wherein:
the control unit transmits the key information after encrypting it with such a key that the relay station can decrypt it.

11. A radio communication method comprising:
in a relay station, receiving a signal sequence indicating a connection request from a radio terminal, the signal sequence being selected by the radio terminal from among a group of predetermined signal sequences shared by a plurality of radio terminals, measuring, when the signal sequence is received, deviations of transmission parameters of the radio terminal in the received signal sequence from standard transmission parameters, generating a message indicating that the radio terminal newly requesting connection exits, when the measured deviations of the transmission parameters are within predetermined ranges, and transmitting the message; and
in a radio base station, receiving the message, determining whether or not to newly permit connection of the radio terminal, generating a response message including the determination result, and transmitting the response message.

12. The radio communication method as claimed in claim 11, wherein:
the message is not transmitted to the radio base station when the measured deviations of the transmission parameters are not within the predetermined ranges.

* * * * *